(12) United States Patent
Finnerty et al.

(10) Patent No.: US 12,341,226 B1
(45) Date of Patent: Jun. 24, 2025

(54) INTEGRATED CPOX/STREAM REFORMER AND FUEL CELL SYSTEM

(71) Applicant: WATT FUEL CELL CORP., Mount Pleasant, PA (US)

(72) Inventors: Caine M. Finnerty, Mount Pleasant, PA (US); Kang Wang, Wexford, PA (US)

(73) Assignee: Watt Fuel Cell Corp., Mt. Pleasant, PA (US)

( * ) Notice: Subject to any disclaimer, the term of this patent is extended or adjusted under 35 U.S.C. 154(b) by 0 days.

(21) Appl. No.: 18/878,361

(22) PCT Filed: Aug. 7, 2024

(86) PCT No.: PCT/US2024/041218
§ 371 (c)(1),
(2) Date: Dec. 23, 2024

(51) Int. Cl.
*H01M 8/0612* (2016.01)

(52) U.S. Cl.
CPC ................................. *H01M 8/0618* (2013.01)

(58) Field of Classification Search
CPC .................................................... H01M 8/0618
See application file for complete search history.

(56) References Cited

U.S. PATENT DOCUMENTS

| | | |
|---|---|---|
| 4,321,250 A | 3/1982 | Hart |
| 4,511,673 A | 4/1985 | Eto |
| 4,567,117 A | 1/1986 | Patel et al. |
| 5,149,516 A | 9/1992 | Han et al. |
| 5,447,705 A | 9/1995 | Petit et al. |
| 5,527,631 A | 6/1996 | Singh et al. |
| 5,714,091 A | 2/1998 | Mazanec et al. |
| 5,993,989 A | 11/1999 | Baozhen et al. |
| 6,143,203 A | 11/2000 | Zeng et al. |
| 6,228,521 B1 | 5/2001 | Kim et al. |
| 6,379,586 B1 | 4/2002 | Zeng et al. |
| 6,402,989 B1 | 6/2002 | Gaffney |
| 6,436,565 B1 | 8/2002 | Song et al. |
| 6,458,334 B1 | 10/2002 | Tamhankar et al. |
| 6,521,204 B1 | 2/2003 | Borup et al. |
| 6,692,707 B1 | 2/2004 | Hirabayashi |
| 6,770,106 B1 | 8/2004 | Okamoto et al. |
| 6,887,456 B2 | 5/2005 | Xu et al. |
| 6,984,371 B2 | 1/2006 | Zhao et al. |
| 7,001,867 B2 | 2/2006 | Jin et al. |
| 7,070,752 B2 | 7/2006 | Zeng et al. |
| 7,090,826 B2 | 8/2006 | Jiang et al. |
| 7,118,717 B2 | 10/2006 | Shore |
| 7,151,067 B2 | 12/2006 | Sakon et al. |
| 7,232,352 B2 | 6/2007 | Splaine |

(Continued)

*Primary Examiner* — Stewart A Fraser
(74) *Attorney, Agent, or Firm* — Dilworth & Barrese, LLP

(57) ABSTRACT

A high efficiency fuel reforming and/or electricity generating system and method utilizes the heat generated by CPOX reforming and or fuel cell operation as an energy source to drive steam reforming. Enhanced efficiencies of over 10%, 35%, 40%, and even over 50-55% can be achieved. A CPOX reformer generates hydrogen. A fuel cell converts this hydrogen into electricity, heat and steam. A secondary fuel line can be combined with the heat and steam generated by the fuel cell and steam reform the secondary fuel into additional hydrogen. This additional hydrogen can be used to generate additional electricity, creating even more heat and steam.

15 Claims, 10 Drawing Sheets

(56) References Cited

U.S. PATENT DOCUMENTS

| | | | |
|---|---|---|---|
| 7,410,717 B2 | 8/2008 | Moon et al. | |
| 7,498,095 B2 | 3/2009 | Finnerty et al. | |
| 7,828,863 B2 * | 11/2010 | Lindstrom .......... | H01M 8/0618 |
| | | | 423/644 |
| 7,888,278 B2 | 2/2011 | Rapier et al. | |
| 7,909,826 B2 | 3/2011 | Serhan et al. | |
| 7,976,787 B2 | 7/2011 | England et al. | |
| 8,323,365 B2 | 12/2012 | Drnevich et al. | |
| 8,435,683 B2 | 5/2013 | Finnerty et al. | |
| 8,486,301 B2 | 7/2013 | Berry et al. | |
| 9,624,104 B2 | 4/2017 | Finnerty et al. | |
| 9,627,699 B2 | 4/2017 | Finnerty et al. | |
| 9,627,700 B2 | 4/2017 | Finnerty et al. | |
| 9,627,701 B2 | 4/2017 | Finnerty et al. | |
| 9,774,055 B2 | 9/2017 | Finnerty et al. | |
| 9,878,908 B2 | 1/2018 | Finnerty et al. | |
| 10,676,354 B2 | 6/2020 | Finnerty et al. | |
| 2007/0287038 A1 * | 12/2007 | Lindstrom .......... | H01M 8/0618 |
| | | | 48/197 R |
| 2010/0015039 A1 | 1/2010 | Doshi et al. | |
| 2013/0028815 A1 | 1/2013 | Basini et al. | |
| 2016/0264416 A1 | 9/2016 | Finnerty et al. | |
| 2019/0148744 A1 | 5/2019 | Choi et al. | |

\* cited by examiner

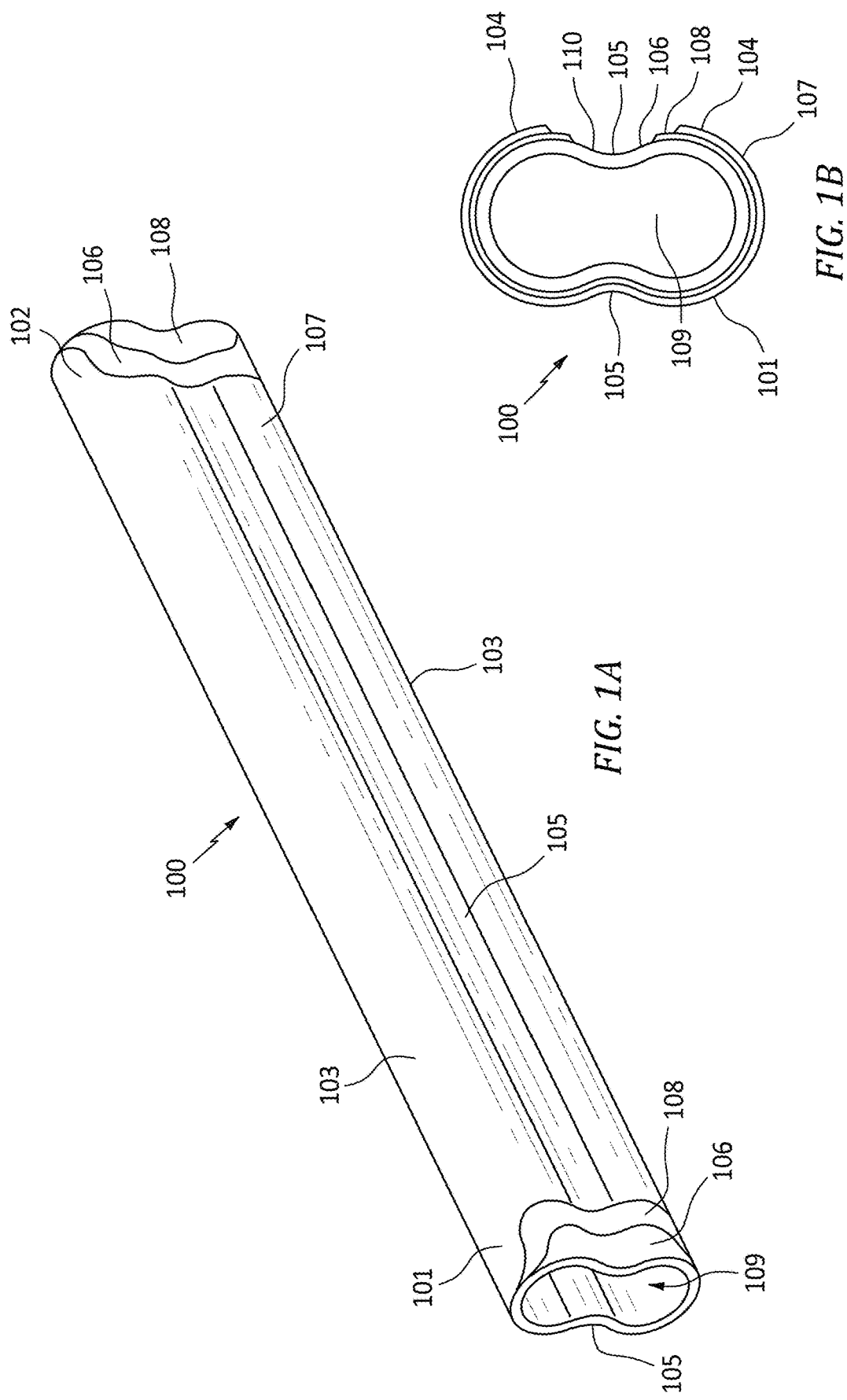

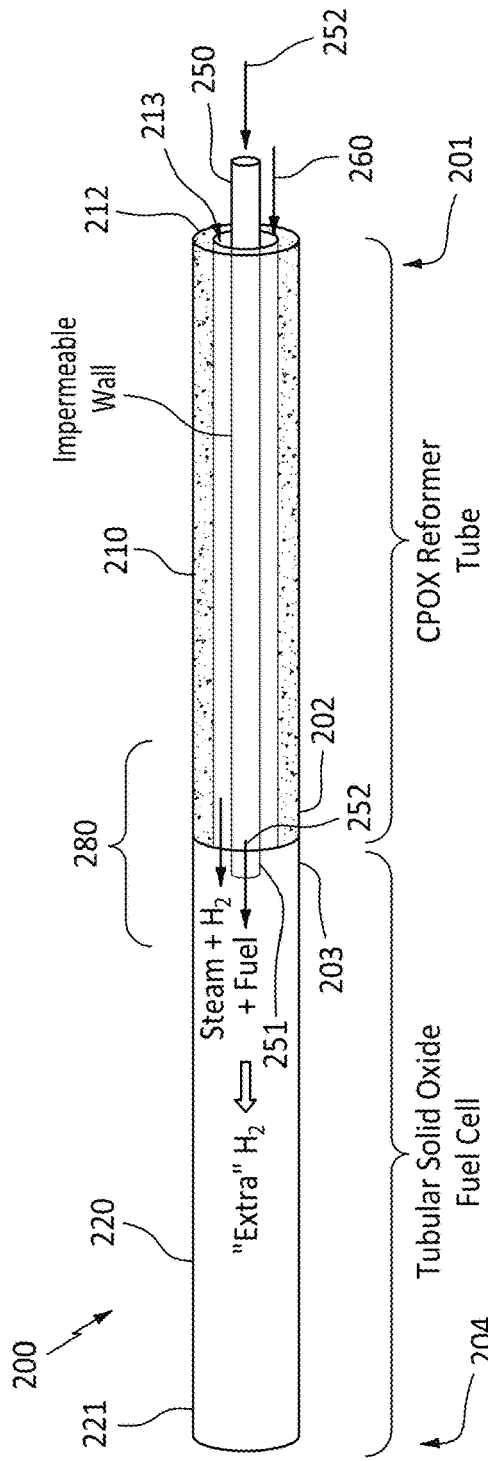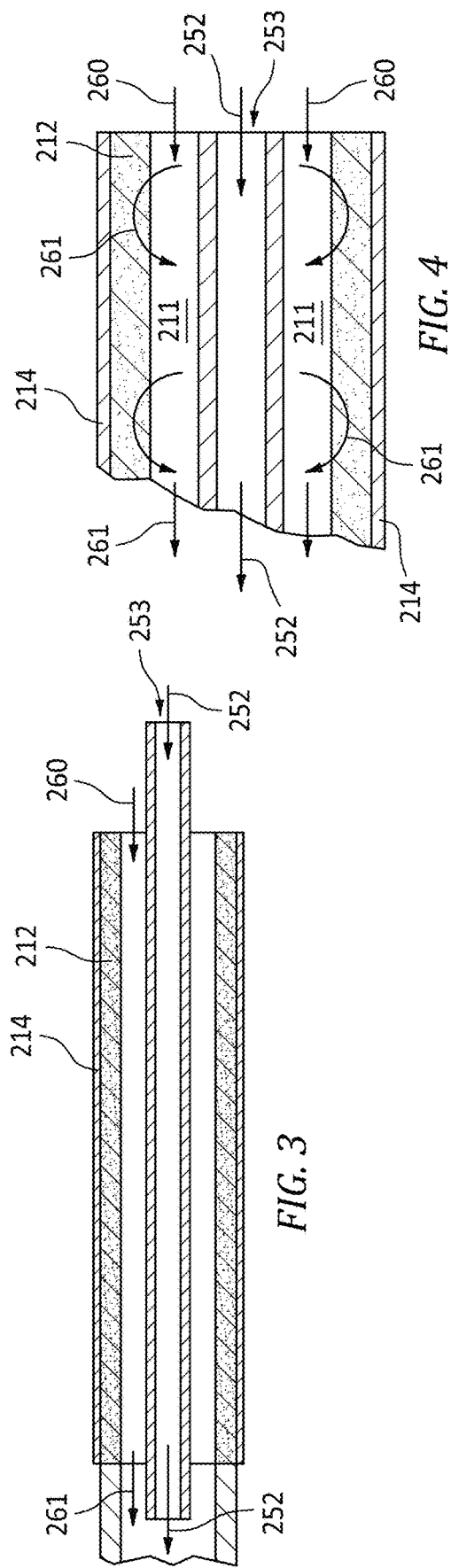
FIG. 2
FIG. 3
FIG. 4

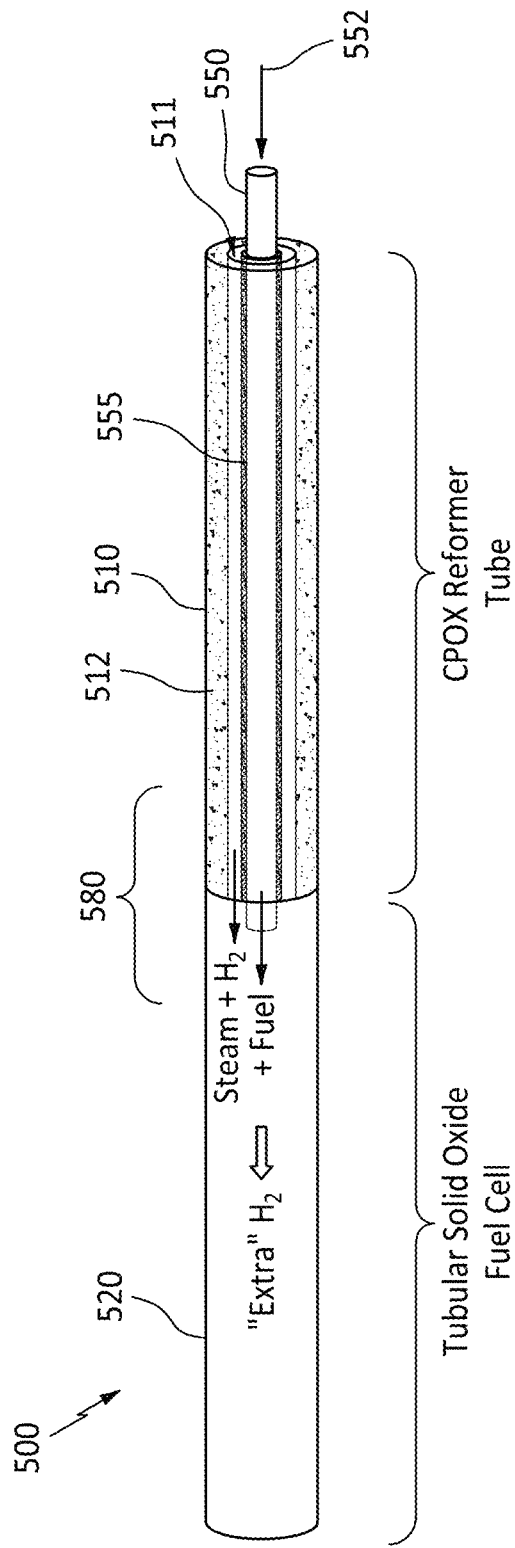
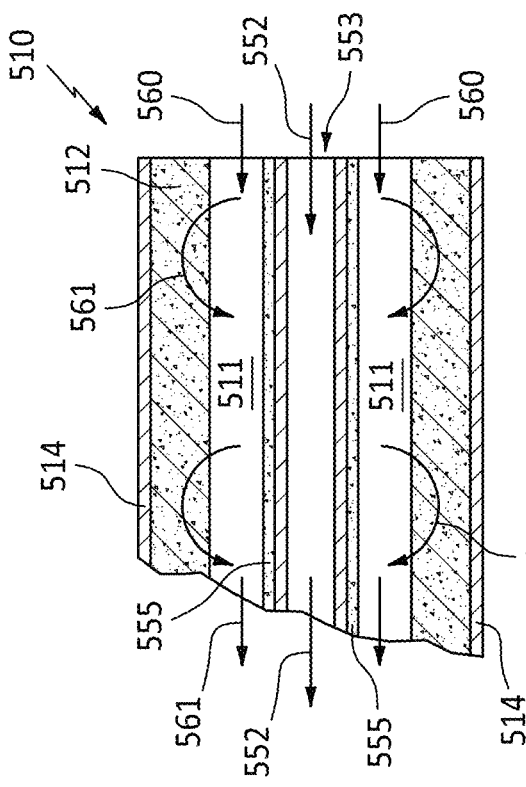
FIG. 5
FIG. 6

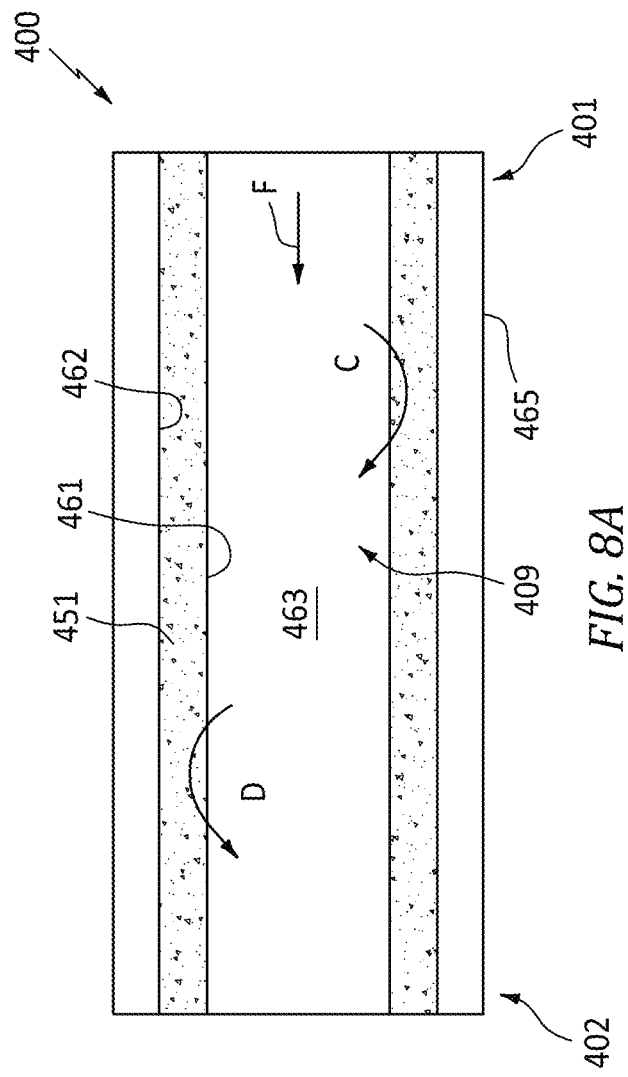
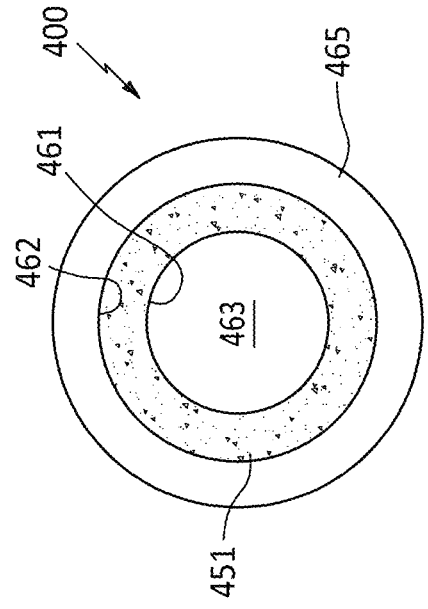
FIG. 8A
FIG. 8B

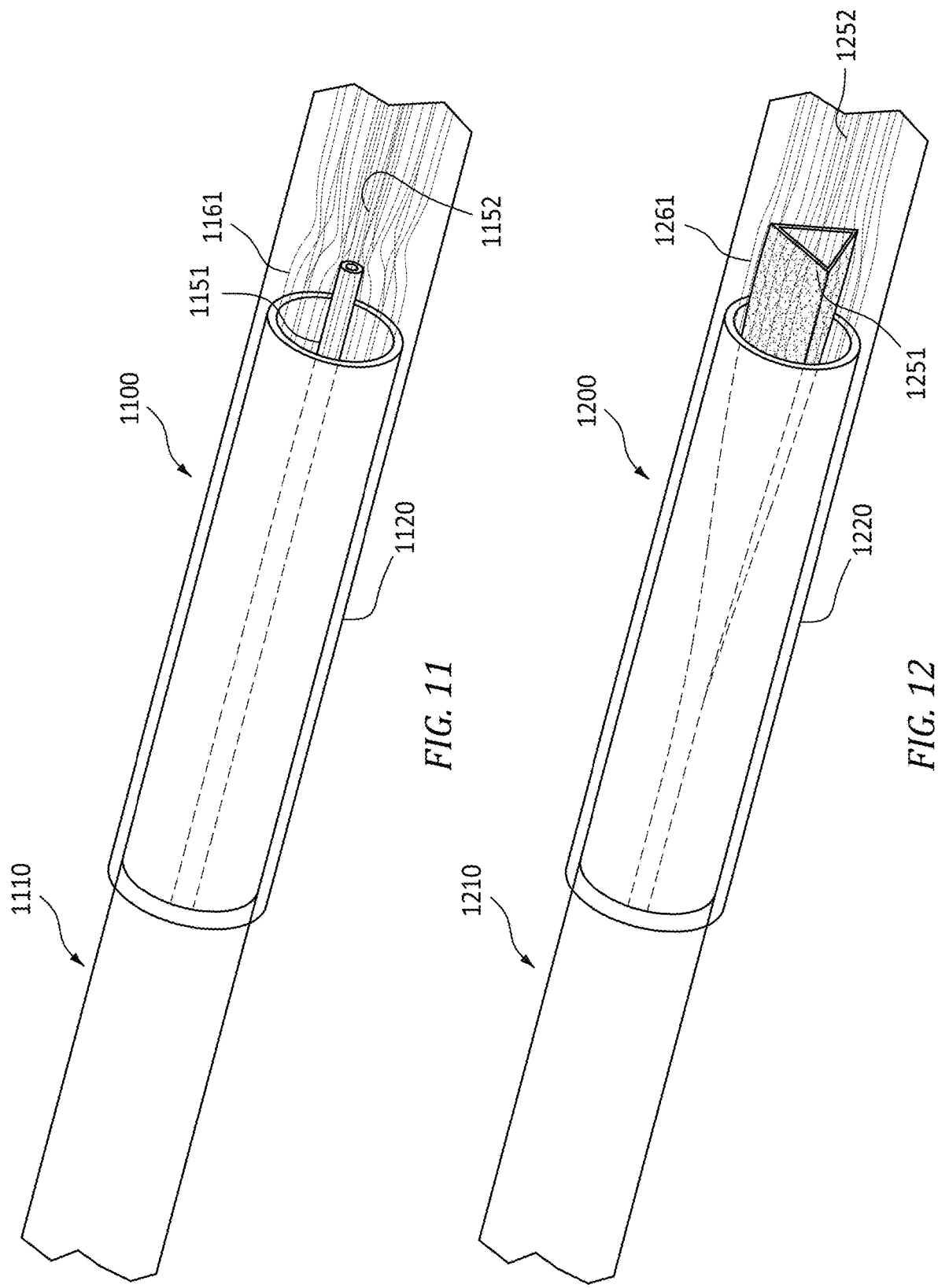

INTEGRATED CPOX/STREAM REFORMER AND FUEL CELL SYSTEM

CROSS REFERENCE TO RELATED APPLICATIONS

This application claims priority to PCT/US2024/041218, the entire contents of this application is incorporated herein by reference.

BACKGROUND OF THE INVENTION

The invention relates to the reformation of gaseous or vaporized liquid reformable fuel, used to produce hydrogen-rich reformates that can be converted to electricity with a fuel cell.

The conversion of a gaseous or liquid reformable fuel to a hydrogen-rich, carbon monoxide-containing gas mixture, a product commonly referred to as "synthesis gas" or "syngas," can be carried out in accordance with known fuel reforming operations such as steam reforming, dry reforming, autothermal reforming, and catalytic partial oxidation (CPOX) reforming. Each of these fuel reforming operations has its distinctive chemistry and requirements, and each is marked by its advantages and disadvantages relative to the others.

The development of improved fuel reformers, fuel reformer components, and reforming processes continues to be the focus of considerable research. Fuel cells have the potential to electrochemically convert oxidizable fuels such as mixtures of methane, propane, hydrogen and carbon monoxide, and the like, to electricity, with high efficiency. Thus, they have the potential to play a greatly expanded role for general applications including main power units (MPUs) and auxiliary power units (APUs). Fuel cells also can be used for specialized applications. These include uses as on-board electrical generating devices for electric vehicles, backup power sources for residential-use devices, main power sources for leisure-use, outdoor and other power-consuming devices in out-of-grid locations, and lighter weight, higher power density, ambient temperature-independent replacements for portable battery packs. However, current size and efficiency limitations continue to be causes for concern. Efficiency can be based on the potential chemical energy of the fuel, relative to the actual power generated.

As is the case with fuel reformers, known and conventional fuel cells come in a variety of types and configurations, including phosphoric acid fuel cells (PAFCs), alkaline fuel cells (AFCs), polymer electrolyte membrane (or proton exchange membrane) fuel cells (PEMFCs), and solid oxide fuel cells (SOFCs). Further, a number of variations exist within each of these types of fuel cells. For example, SOFCs can be classified as belonging to one of three main sub-types: tubular, planar, and monolithic, with many representatives of each sub-type known in the art. Similar to fuel reformers, each different type and sub-type of fuel cell has its advantages and disadvantages relative to the others.

CPOX reforming, or simply CPOX, is an efficient way of converting readily available reformable fuels such as methane, ethane, propane, and kerosene into hydrogen-rich reformate. The reformates can be supplied to fuel cell stacks, for example, those having nominal power ratings of anywhere from 50 watts to 100 kilowatts, and all power ratings in between. Among the advantages of CPOX reforming is that the reaction is exothermic, in contrast to steam reforming and dry reforming, which are endothermic reactions that require an external source of heat or additional heat exchanger components, balance of plant and controls.

Furthermore, CPOX reactions are generally faster than other reforming reactions. This speed allows for the construction of relatively small reformers that are capable of fast start-up and rapid responses to changes in load. CPOX reformers also tend to be simpler in design than reformers that require the handling of water and steam. For example, conventional steam reformers and autothermal reformers typically require storage units and piping for water, additional heating units for the production of steam, burner or combustion units for supplying heat to drive endothermic reforming reactions, and the like. These also have associated fluid routing and operation-monitoring and control devices.

Accordingly, it is desirable to provide energy systems that are more compact, more efficient in converting chemical potential into electric power, and more rapidly adjustable, as well as overcoming other deficiencies in fuel cells and other energy systems needed to overcome inadequacies in the prior art.

SUMMARY OF THE INVENTION

Generally speaking, in accordance with the invention, a high efficiency fuel reforming and/or electricity generating device is provided. Systems and methods in accordance with the invention utilize the heat generated by CPOX reforming and/or fuel cell operation as the energy source to drive secondary endothermic reforming reactions. By employing this already existing heat source and electrochemistry to generate the heat and steam needed for steam reforming, enhanced efficiencies of over 35%, 40%, and even over 50-55% can be achieved.

In one embodiment of the invention, a secondary fuel line supplying a secondary stream of gaseous or vaporized liquid fuel extends through and is heated by a CPOX reformer generating syngas. The syngas is fed to a fuel cell, which generates electricity, heat and steam. This pre-heated fuel is then combined with the heat and steam generated by the fuel cell to steam reform the fuel from the secondary fuel line. The heat generated from CPOX reforming and/or fuel cell operation is used to supply energy needed for the steam generated by the fuel cell to steam reform the secondary fuel stream into additional hydrogen. This additional hydrogen is then used by the fuel cell to produce additional electricity.

In preferred embodiments of the invention, the CPOX reformer is in the form of a hollow open bore defined by a wall containing or comprising CPOX catalyst. Fuel flows into the hollow bore and diffuses into the catalyst of the wall. Hydrogen, CO, unreformed fuel, unreacted oxygen, $CO_2$ and possibly some steam diffuse back into the hollow bore. Running the CPOX reaction fuel rich minimizes steam production. Operating it lean, and maximizing the air ration will increase steam and $CO_2$ production. This can lead to carbon deposits and other problems. Therefore, it is generally preferable to operate the CPOX reforming reactor with a fuel rich fuel:air ratio.

A hydrogen barrier over the outside surface of the wall prevents loss of hydrogen. The secondary fuel line extends through the hollow bore, and emits the secondary gaseous (or vaporized liquid) fuel slightly past the downstream end of the CPOX reformer, slightly past the upstream end of the fuel cell. Here, it encounters the CPOX product stream and steam electrochemically produced in the fuel cell, resulting in the additional production of hydrogen through steam reforming the secondary fuel stream. In the preferred embodiment of the invention, this steam reforming takes place within a fuel cell extending from the end of the CPOX reformer. In another embodiment of the invention, a layer of CPOX catalyst is disposed around the secondary fuel line.

In still another embodiment of the invention, a reforming fuel cell, containing CPOX catalyst reacts hydrocarbon-based fuel with oxygen, such as from air, to produce hydrogen and, carbon monoxide. Electricity generation produces steam. Both reforming and electricity production generate heat. A secondary fuel line extends through this reforming fuel cell, and secondary fuel emitted from the downstream end of the secondary fuel line is reformed by the steam to produce additional hydrogen, and the fuel cell converts this additional hydrogen into electricity.

BRIEF DESCRIPTION OF THE DRAWINGS

For a fuller understanding of the invention, reference is had to the following description, taken in connection with the following drawings, which are included for purposes of illustration only, and should not be interpreted as limiting. The drawings are not necessarily to scale, in order to enhance their illustrative function. Like reference numerals are used to refer to similar parts.

FIG. 1A is a perspective cutaway view and FIG. 1B is an end view of a fuel cell component for use in accordance with an embodiment of the invention;

FIG. 2 is a schematic sectional side view of a fuel cell with integrated CPOX and steam reforming, in accordance with an embodiment of the invention;

FIG. 3 is a cross-sectional view of a fuel cell with integrated CPOX and steam reforming, in accordance with an embodiment of the invention;

FIG. 4 is an enlarged view of a portion of the integrated reformer of FIG. 3;

FIG. 5 is a schematic side view of a fuel cell with integrated CPOX and steam reforming, in accordance with an embodiment of the invention;

FIG. 6 is a partial cross-sectional view of the reformer of FIG. 5;

FIG. 8A is a cross-sectional view of the CPOX reforming portion of an integrated reformer, in accordance with an embodiment of the invention;

FIG. 8B is an end view of the reforming portion of the integrated reformer of FIG. 8A;

FIG. 11 is a transparent perspective view of a straight, uniform diameter injector for injecting secondary fuel into the upstream end of the fuel cell in accordance with an embodiment of the invention;

FIG. 12 is a transparent view of a flared injector for injecting secondary fuel into the upstream end of a fuel cell in accordance with an embodiment of the invention.

DETAILED DESCRIPTION OF THE PREFERRED EMBODIMENTS

Figures 1C, 1D:
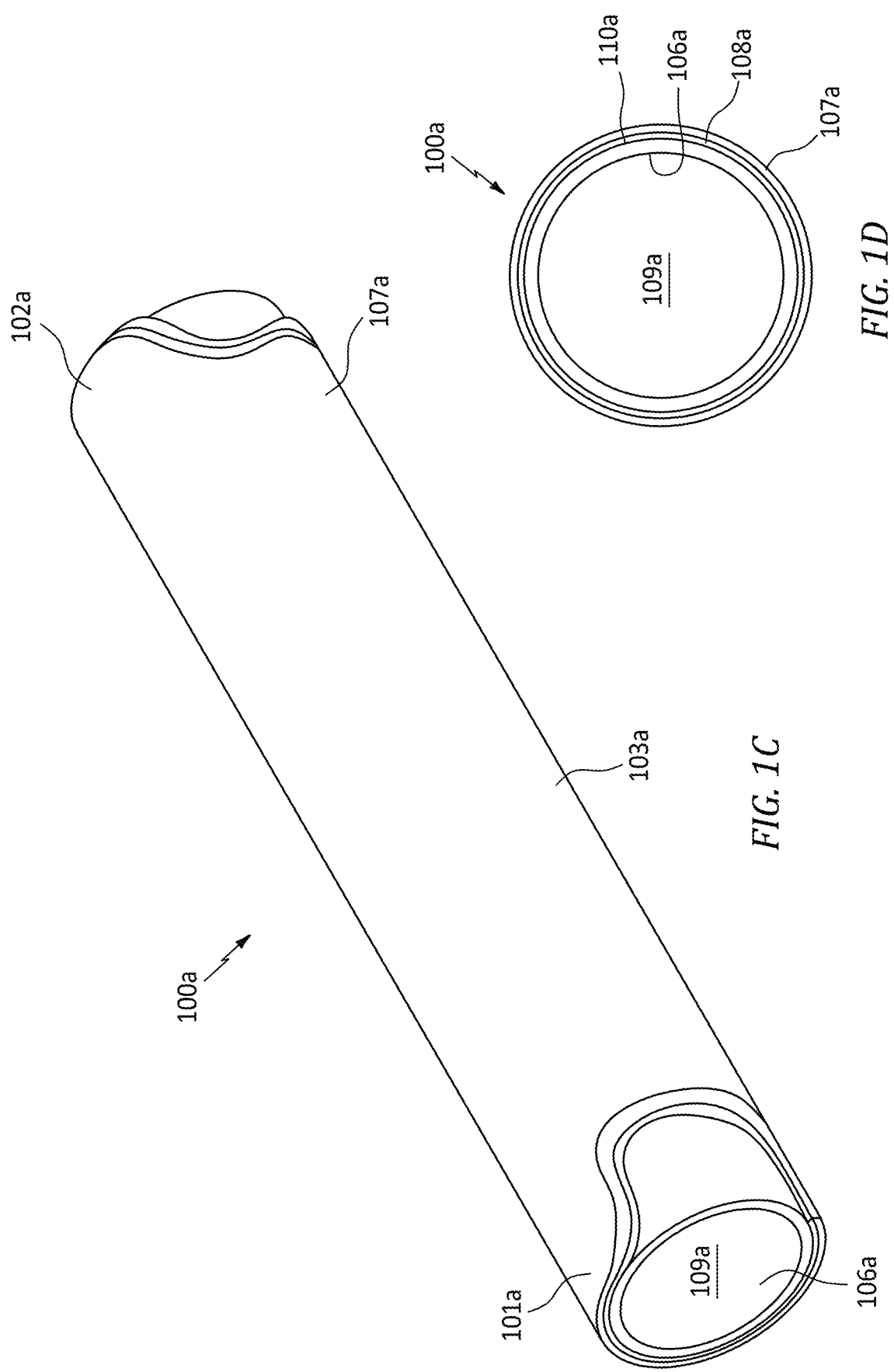
FIG. 1C is a perspective cutaway view and FIG. 1D is an end view of a fuel cell component for use in accordance with an another embodiment of the invention.

The invention relates to a system utilizing the heat and steam given off by CPOX reforming and fuel cell electricity generation to perform secondary in-situ steam reforming. This results in an increase in the energy generation efficiency of the CPOX reforming and fuel cell performance. The reforming and/or fuel cell operation generate heat and steam. A secondary fuel source injects additional fuel into the upstream region of the fuel cell and the heat and steam, subject the secondary fuel stream to steam reforming, to generate additional hydrogen gas. Thus, systems in accordance with the invention include CPOX reforming sections, fuel cell sections, and even fuel reforming fuel cells, with the goal of converting reformable fuel into hydrogen rich reformate gas, and generating electricity with that gas. The CPOX reforming sections, fuel cell sections, and reforming fuel cell sections of systems in accordance with the invention will be described below.

It is to be understood that the present teachings herein are not limited to the particular procedures, materials and modifications described and as such can vary. It is also to be understood that the terminology used is for purposes of describing particular embodiments only and is not intended to limit the scope of the present teachings which will be limited only by the appended claims.

Throughout the application, where compositions are described as having, including or comprising specific components, or where methods are described as having, including, or comprising specific method steps, it is contemplated that such compositions also consist essentially of, or consist of, the recited components and that such methods also consist essentially of, or consist of, the recited method steps.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition, an apparatus, or a method described herein can be combined in a variety of ways without departing from the focus and scope of the present teachings whether explicit or implicit therein. For example, where reference is made to a particular structure, that structure can be used in various embodiments of the apparatus and/or method of the present teachings.

The use of the terms "include," "includes," "including," "have," "has," "having," "contain," "contains," or "containing," including grammatical equivalents thereof, should be generally understood as open-ended and non-limiting, for example, not excluding additional unrecited elements or steps, unless otherwise specifically stated or understood from the context.

The use of the singular herein, for example, "a," "an," and "the," includes the plural (and vice versa) unless specifically stated otherwise.

Where the use of the term "about" is before a quantitative value, the present teachings also include the specific quantitative value itself, unless specifically stated otherwise. As used herein, the term "about" refers to a ±10% variation from the nominal value unless otherwise indicated or inferred.

It should be understood that the order of steps or order for performing certain actions is immaterial so long as the present teachings remain operable. For example, the methods described herein can be performed in any suitable order unless otherwise indicated herein or otherwise clearly contradicted by context. Moreover, two or more steps or actions can be conducted simultaneously.

At various places in the present specification, values are disclosed in groups or in ranges. It is specifically intended that a range of numerical values disclosed herein include each and every value within the range and any subrange thereof. For example, a numerical value within the range of 0 to 20 is specifically intended to individually disclose 0, 1, 2, 3, 4, 5, 6, 7, 8, 9, 10, 11, 12, 13, 14, 15, 16, 17, 18, 19 and 20, and any subrange thereof, for example, from 0 to 10, from 8 to 16, from 16 to 20, etc.

The use of any and all examples, or exemplary language provided herein, for example, "such as," is intended merely to better illuminate the present teachings and does not pose a limitation on the scope of the invention unless claimed. No language in the specification should be construed as indicating any non-claimed element as essential to the practice of the present teachings.

Terms and expressions indicating spatial orientation or attitude such as "upper," "lower," "top," "bottom," "horizontal," "vertical," and the like, unless their contextual usage indicates otherwise, are to be understood herein as having no structural, functional or operational significance and as merely reflecting the arbitrarily chosen orientation of the various views of liquid fuel CPOX reformers of the present teachings illustrated in certain of the accompanying figures.

The term "ceramic," in addition to its art-recognized meaning, shall be understood herein to include glasses, glass-ceramics, refractories and cermets (i.e., ceramic-metal composites).

The expression "gas permeable" as it applies to a wall of a CPOX reactor unit or CPOX catalyst covered surface herein shall be understood to mean a wall or coating structure that is permeable to gaseous CPOX reaction mixtures and gaseous product reformate including, without limitation, the vaporized liquid or gaseous reformable fuel component of the gaseous CPOX reaction mixture and the hydrogen component of the reformate product.

The expression "liquid reformable fuel" shall be understood to include reformable carbon- and hydrogen-containing fuels that are a liquid at standard temperature and pressure (STP) conditions, for example, methanol, ethanol, naphtha, distillate, gasoline, kerosene, jet fuel, diesel, biodiesel, and the like, that when subjected to reforming, undergo conversion to hydrogen-rich reformates. The expression "liquid reformable fuel" shall be further understood to include such fuels whether they are in the liquid state or in the vaporized gaseous state, i.e., a vapor.

The expression "gaseous reformable fuel" shall be understood to include reformable carbon- and hydrogen-containing fuels that are a gas at STP conditions, for example, methane, ethane, propane, butane, isobutane, ethylene, propylene, butylene, isobutylene, dimethyl ether, their mixtures, such as natural gas and liquefied natural gas (LNG), which are mainly methane, and petroleum gas and liquefied petroleum gas (LPG), which are mainly propane or butane but include all mixtures made up primarily of propane and butane, and the like, that when subjected to reforming undergo conversion to hydrogen-rich reformates.

The term "reformer" shall be understood to include any device or apparatus in which one or more reforming reactions resulting in the conversion of reformable fuel to a hydrogen-rich reformate take place. The term "reformer" therefore applies to reactors in which such operations as steam reforming, dry reforming, autothermal reforming, catalytic partial oxidation (CPOX) reforming or a combination of two or more such reforming operations takes place, and to fuel cells having internal reforming capability.

The expression "reforming reaction" shall be understood to include the reaction(s) that occur during reforming or conversion of a reformable fuel to a hydrogen-rich reformate.

The expression "reforming reaction mixture" refers to a mixture including a vaporized liquid reformable fuel, a gaseous reformable fuel or combinations thereof, an oxidizer, for example, oxygen supplied as air, and in the case of steam or autothermal reforming, steam.

The expression "catalytic reforming" shall be understood to refer to any and all reforming reactions that are, or may be, carried out in the presence of a reforming catalyst and specifically include, without limitation, steam reforming autothermal reforming and catalytic partial oxidation (CPOX) reforming.

CPOX Reforming

The CPOX reforming section of integrated systems in accordance with preferred embodiments of the invention can take several forms. In particular, the reformers can take the form of (1) packed column reformers, wherein the CPOX catalyst fills the interior of the column walls; and (2) hollow columns, where the walls comprise or contain the CPOX catalyst, and define an open gas flow passageway, wherein the reaction mixture of fuel and oxygen diffuses into the catalyst containing wall (or wall portion) and reformate and unused fuel and oxygen diffuse back to the open gas passageway. CPOX Reformers are described, e.g., in U.S. Pat. Nos. 9,624,104, 9,627,699, 9,627,700, 9,627,701, and 9,878,908, the contents of which are incorporated herein by reference in their entirety.

CPOX Monoliths

One type of CPOX reformer includes a catalyst support component, commonly referred to as a "catalyst monolith," "monolith catalyst support," "monolith substrate," or simply a "monolith," which has a CPOX catalyst or catalyst system deposited thereon. Integrated systems in accordance with preferred embodiments of the invention extend a secondary fuel line through the monolith substrate and emit the secondary fuel to mix with the effluent of the monolith. The structure of these monoliths is described below.

Monoliths can be classified on the basis of two general configurations: a first configuration characterized by a metal or ceramic body of often a honeycomb-like, channeled, metallic gauze or spiral-wound corrugated sheet structure presenting an essentially linear gaseous flow path therethrough, and a second configuration characterized by a metal or ceramic foam body of reticulated, or open, pore structure presenting a tortuous gaseous flow path therethrough. Representative monoliths of these types are disclosed in, for example, U.S. Pat. Nos. 5,527,631; 6,402,989; 6,458,334; 6,692,707; 6,770,106; 6,887,456; 6,984,371; 7,090,826; 7,118,717; 7,232,352; 7,909,826; 7,976,787; 8,323,365; and, U.S. Patent Application Publication No. 2013/0028815, incorporated herein in their entirety.

The monolith can include a honeycomb-like ceramic body made up of numerous channels impregnated or wash-coated with CPOX catalyst, an inlet end for admitting a gaseous CPOX reaction mixture, i.e., a mixture of a gaseous oxidizing agent, typically air, and reformable fuel, e.g., a gaseous fuel such as methane, natural gas, propane or butane or a vaporized liquid fuel such as gasoline, kerosene, jet fuel or diesel. The monolith can also have an outlet end for discharging the hydrogen-rich, water vapor and carbon monoxide-containing reformate product (syngas). Between the inlet and outlet is the CPOX reaction zone, which can be essentially coextensive with the entire monolith. Monoliths and other types of CPOX reformers typically experience fairly high CPOX reaction temperatures. These can range from 600° C. to 1,100° C. Thus, at CPOX reaction temperatures of 600° C.-1,100° C., the reformer is quite exothermic. The secondary fuel line can extend from the inlet to the outlet of the structure.

Figure 10:
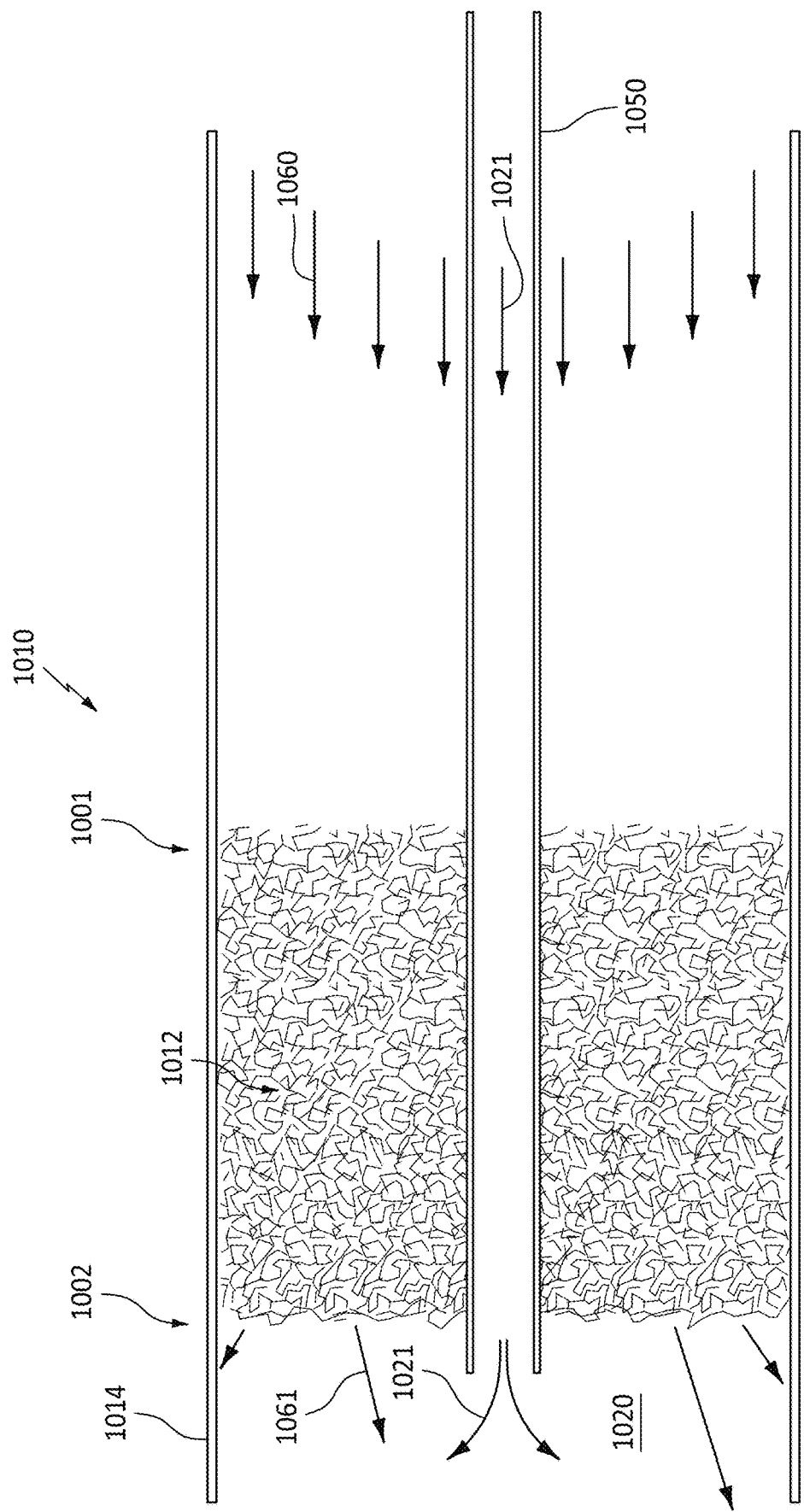
FIG. 10 is a schematic view of an integrated CPOX and steam reformer, in accordance with an embodiment of the invention.

Referring to FIG. 10, a CPOX reformer section in accordance with preferred embodiments of the invention is shown generally as CPOX reformer section 1010. Reformer section 1010 extends from an upstream end 1001 to a downstream end 1002. CPOX reformer section 1010 comprises a hydrogen impermeable tube or column 1014 packed with CPOX catalyst particles (or honeycomb) 1012. CPOX catalyst 1012 contains internal gas passageways to permit the CPOX reaction mixture of reformable fuel and oxygen (air) to flow from upstream end 1001, through reforming section 1010, to downstream end 1002.

A first stream of gaseous or vaporized fuel 1060 flows into reformer section 1010 and undergoes CPOX reformation into hydrogen, carbon monoxide, and at fuel lean ratios, some steam, which exit with unreformed fuel and unused oxygen as a reformate mixture 1061. Hydrogen rich reformate mixture 1061 can flow to a fuel cell for electricity generation. A secondary fuel line 1050 can inject additional reformable fuel as a secondary fuel stream 1021 to mix with the steam generated downstream in a fuel cell 1020. That steam and the heat of exotherm from the CPOX reaction plus heat generated by fuel cell 1020 can be used to steam reform secondary fuel 1021, leading to the generation of additional hydrogen with essentially no increase in apparatus size or energy input. This process of integrating steam reformation with CPOX reforming will be discussed more fully below.

It is important to carefully monitor and control the CPOX reaction conditions to prevent or inhibit the phenomenon of "flashing," i.e., the premature combustion of the CPOX gaseous reaction mixture stream within a radiant heat zone, as the stream approaches inlet end 1001. Heat of exotherm of the CPOX reaction occurring within the initial portion of the CPOX reaction zone proximate to inlet end 1001 will generally radiate outwardly therefrom. This radiant heat can undesirably be of sufficient intensity to raise the temperature of the advancing CPOX reaction mixture stream to its flash point. Flashing of the CPOX reaction mixture within the radiant heat zone can cause undesirable thermal events, raising the temperature to a point where catalyst can be vaporized or deactivated and/or reformer structure can be damaged or rendered inoperative. These thermal events can also lead to undesirable cracking of fuel within this zone and, consequently, increased coke (carbon particle) formation resulting in deterioration of CPOX catalyst performance. Steam, $CO_2$ and concurrent coke production can also occur if the CPOX fuel:air reaction ratio is too lean. Where the hydrogen-rich reformate effluent is utilized as fuel for a fuel cell stack, coke and unreformed higher hydrocarbon fragments contained therein can also undesirably deposit on the anode and other surfaces of the fuel cells, resulting in reduced conversion of product reformate to electricity.

One type of foam monolith for CPOX reforming, as CPOX catalyst 1012, includes a ceramic foam body, characterized by a reticulated or open network of interconnected pores and pore channels supporting a CPOX catalyst or catalyst system deposited thereon by conventional or otherwise known procedures, e.g., impregnation or wash coating. One drawback of foam monoliths is their higher pressure drops, due to their higher resistance to flow compared with linear-flow monoliths such as honeycomb-like monoliths. Higher pressure drops require higher operational pressures, and therefore higher energy consumption to meet target flows. Another inherent drawback of a foam monolith lies in the random nature of the flow paths of gaseous reactants and reaction products therein. The characteristic randomness of these flow paths results in very uneven temperature profiles within the monolith, increasing the risk of thermal shock due to hot spots and/or reduced CPOX conversion rates due to cold spots.

CPOX Reactor Walls

One way to improve the structure of the CPOX reforming section of an integrated CPOX/steam reformer of the invention is to reduce back pressure and/or provide little or no opportunity or tendency for flashing or "run-away" thermal events. Better control of the temperature enables more integrated closer combinations of the CPOX reformer and fuel cell sections. For example, the outlet of the CPOX reactor units can fit just inside the inlet inlet of the fuel cell units, thereby permitting direct coupling of the units.

The gaseous (or vaporized) fuel CPOX reformer section can advantageously be formed as an array of spaced-apart, but separated CPOX reactor units as described more fully below with reference to FIG. 9. Each of these reactors can include a secondary fuel line and subject the secondary fuel to steam reforming from steam produced by the respective fuel cells. These separated units advantageously include an igniter in thermal communication with the CPOX catalyst portion of at least one CPOX reactor unit of the gaseous fuel CPOX reformer.

An especially preferred CPOX reactor includes CPOX catalyst in the reactor walls only, said walls surrounding a hollow, open gas flow passageway defined by the CPOX catalyst containing walls. The CPOX reactor unit can advantageously take the form of a CPOX catalyst-containing wall or coated/covered wall structure, surrounding a hollow, open bore. As discussed below with reference to FIGS. 2 and 3, this hollow, open bore provides no obstruction, other than surface roughness, to impede the flow of the CPOX reaction mixture of reformable fuel and air and the outflow of reaction product. The inner surface of the wall is porous and gas permeable. The outer surface is covered with a hydrogen barrier constructed to prevent the loss of hydrogen. The gaseous reaction mixture flowing through the hollow bore will diffuse into the catalytic wall, where the catalyzed partial oxidation into hydrogen and carbon monoxide will take place. The hydrogen barrier over the outer surface of the wall prevents loss of reformed product.

Hydrogen Barrier

To prevent or inhibit the loss of hydrogen product produced in the gas-permeable wall, a hydrogen barrier should be disposed on or over the outer surface of the wall, or at least the outer surface of the wall corresponding to the reforming reaction zone portion of the wall. Materials capable of functioning as effective hydrogen barriers should be thermally stable at the temperatures typical of reforming reactions and should be sufficiently dense to prevent or deter permeation or diffusion of reformate gases, particularly hydrogen, therethrough.

A variety of ceramic materials (inclusive of glasses and glass-ceramics) and metals meeting these requirements are known and are suitable for providing the hydrogen barrier. Specific materials for the hydrogen barrier include, for example, aluminum, nickel, molybdenum, tin, chromium, alumina, recrystallized alumina, aluminides, alumino-silicates, titania, titanium carbide, titanium nitride, boron nitride, magnesium oxide, chromium oxide, zirconium phosphate, ceria, zirconia and doped zirconia oxides, mulite and the like, admixtures thereof and layered combinations thereof.

Where the nature of the material constituting the hydrogen barrier permits, the hydrogen barrier to be applied to at least that portion of an outer surface of a reactor unit wall corresponding to the reforming reaction zone as a preformed layer, foil, film or membrane. The hydrogen barrier can be bonded to the wall with a refractory adhesive. Alternatively, the hydrogen barrier can be formed on an outer surface by employing any suitable deposition method, for example, any of the conventional or otherwise known ceramic-coating and metal-coating techniques such as spray coating, powder coating, brush coating, dipping, casting, co-extrusion, metallizing, and the like, and any of their many variations. A suitable range of thickness for a hydrogen barrier will depend primarily on the hydrogen permeability characteristics of the selected barrier material and the gas permeability characteristics of the wall enclosing the reforming reaction zone. Such thickness should be readily determined by those skilled in the art employing known and conventional experimental techniques. For many barrier materials and perovskite-containing reactor wall structures, the thickness of the hydrogen barrier can vary from about 2 microns to about 15 microns, preferably between about 5 microns to 12 microns.

Perovskite Wall Structure

The CPOX catalyst-containing wall or covering section of a CPOX reactor unit can include a ceramic portion or can be entirely ceramic. The CPOX catalyst containing wall section can be a porous substrate, for example, a porous substrate including a ceramic or a porous ceramic. At least the section of the wall including the CPOX catalyst can be or can include a perovskite. For example, greater than about 20% or greater than about 50% by weight of such wall section can be a perovskite. The CPOX catalyst can be disposed within the wall and/or disposed on an internal surface of the wall, or used to form the wall. For example, a CPOX catalyst or CPOX catalyst system can be deposited on a wall and/or surface of the wall, such as the internal surface of the wall, for example, by impregnation, wash coating, or an equivalent procedure. The CPOX catalyst can also partially or completely form the structure of the wall, i.e., a wall entirely or partially formed of the CPOX catalyst material.

The hydrogen-producing capacity of the reformer is a function of several factors including the type, amount (loading and distribution of reforming catalyst, i.e., perovskite, and any other reforming catalyst(s) that may be present within the gas-permeable wall), the characteristics of the porous structure of the wall (characteristics influencing the gas-permeability of the walls and therefore affecting the reforming reaction) such as pore volume (a function of pore size), the principal type of pore (mostly open, i.e., reticulated, or mostly closed, i.e., non-reticulated), and pore shape (spherical or irregular), the volumetric flow rates of the reforming reaction mixture, reforming reaction temperature, back pressure, and the like.

As indicated above, reformation can take place in a wall with at least a section thereof containing or formed of CPOX catalyst. Such section of the wall corresponds to the reforming reaction zone. Said zone advantageously comprises perovskite, which can function as a structural component thereof in addition to catalyzing the CPOX reaction. Such wall section is preferably formed to be gas-permeable, to allow gaseous reforming reactant to diffuse therein and hydrogen-rich reformate to diffuse therefrom.

Together with, or without, one or more other materials, perovskites can be readily formed into a wall, or section of wall, of a reformer in accordance with the present teachings employing any of several known and conventional techniques, e.g., molding, casting, extrusion, additive manufacturing, lamination, and the like. The resulting perovskite-containing wall structure can be made to exhibit from good-to-excellent mechanical and thermal properties making them particularly advantageous for the fabrication of wall(s)/wall section(s) of all types of reformers.

Perovskites will catalyze fuel reforming reactions, in particular, steam reforming, autothermal reforming and partial oxidation reforming. They are especially useful as materials for forming the wall(s) or wall section(s) of catalytic reformers. In this capacity, perovskites not only provide or contribute significantly to the mechanical and thermal stability properties of catalytic reformers, they also supply the catalyst, either alone or in combination with one or more other reforming catalysts, for a reforming reaction. Perovskite-containing wall structures corresponding to exothermic reforming reaction zone(s) of, for example, catalytic partial oxidation reformers, are able to very well tolerate the mechanical and thermal stresses resulting from the characteristically high exotherms occurring within such zone(s) and from the rapid and frequent change in operational modes (start-up, steady-state and shut-down) which are common for such reformers.

Perovskites possess catalytic activity for reforming reactions such as steam reforming, autothermal reforming and CPOX reforming and are therefore useful not only for the fabrication of the wall structure of catalytic reformers corresponding to their reforming reaction zones, they can also supply part or even all of the reforming catalyst.

Any of the conventional and otherwise known perovskites can be utilized herein for the construction of the wall(s) and/or wall section(s) of reformers of all types, including those of the catalytic and non-catalytic variety. Suitable perovskites are described, for example in U.S. Pat. Nos. 4,321,250; 4,511,673; 5,149,516; 5,447,705; 5,714,091; 6,143,203; 6,379,586; 7,070752; 7,151,067; 7,410,717; 8,486,301, and 10,676,354. The entire contents of these patents is incorporated herein by reference.

Perovskite catalysts are a class of reforming catalysts, useful in embodiments of the invention as they are also suitable for the construction of the catalytically active wall structures of a catalytic reformer. Perovskite catalysts are characterized by the structure $ABX_3$ where "A" and "B" are cations of very different sizes and "X" is an anion, generally oxygen, that bonds to both cations. Examples of suitable perovskite CPOX catalysts include $LaNiO_3$, $LaCoO_3$, $LaCrO_3$, $LaFeO_3$ and $LaMnO_3$.

A slight modification of the perovskites generally affects their thermal stability while B-site modification generally affects their catalytic activity. Perovskites can be tailor-modified for particular catalytic reforming reaction conditions by doping at their A and/or B sites. Doping results in the atomic level dispersion of the active dopant within the perovskite lattice thereby inhibiting degradations in their catalytic performance. Perovskites can also exhibit excellent tolerance to sulfur at high temperatures characteristic of catalytic reforming.

Examples of doped perovskites useful as reforming catalysts include $La_{1-x}Ce_xFeO_3$, $LaCr_{1-y}Ru_yO_3$, $La_{1-x}Sr_xAl_{1-y}Ru_yO_3$ and $La_{1-x}Sr_xFeO_3$ wherein x and y are numbers ranging, for example, from 0.01 to 0.5, from 0.05 to 0.2, etc., depending on the solubility limit and cost of the dopants.

Some specific perovskites that can be utilized for the construction of the wall(s)/wall section(s) of the reformer herein are lanthanum strontium manganite (LSM), lanthanum strontium ferrite (LSF), lanthanum strontium cobalt ferrite (LSCF), lanthanum calcium manganite (LCM), lanthanum strontium chromite (LSC), lanthanum strontium gallate magnesite (LSGM), their mixtures with each other and with other perovskites.

The total amount of perovskite employed in the fabrication of the reformer wall(s)/wall section(s) can vary over fairly wide limits provided such amount contributes significantly to their mechanical strength. In general, the entire wall or the reforming section of the reformer, can contain at least 20 weight percent, preferably at least 50 weight percent, and in other embodiments, at least 80 weight percent and up to 100 weight percent, perovskite.

Ceramic Wall Structure

Ceramics are an especially suitable class of materials for the construction of reformer wall structures, due to their relatively low cost compared to many of the refractory metals and metal alloys that are also useful for this purpose. The comparative ease with which such ceramics can be formed into tubular gas-permeable structures of fairly reproducible pore type employing known and conventional pore-forming procedures and the generally highly satisfactory structural/mechanical properties of ceramics (including coefficients of thermal expansion and thermal shock performance) and resistance to chemical degradation make them particularly advantageous materials.

Suitable ceramics include the entire wall structure of a CPOX reactor unit) include, for example, spinels, magnesia, ceria, stabilized ceria, silica, titania, zirconia, stabilized zirconia such as alumina-stabilized zirconia, calcia-stabilized zirconia, ceria-stabilized zirconia, magnesia-stabilized zirconia, lanthana-stabilized zirconia and yttria-stabilized zirconia, zirconia stabilized alumina, pyrochlores, brown-millerites, zirconium phosphate, silicon carbide, yttrium aluminum garnet, alumina, alpha-alumina, gamma-alumina, beta-alumina, aluminum silicate, cordierite, magnesium aluminate, and the like, various ones of which are disclosed in U.S. Pat. Nos. 6,402,989 and 7,070,752, the entire contents of which is incorporated herein by reference; and, rare earth aluminates and rare earth gallates various ones of which are disclosed in U.S. Pat. Nos. 7,001,867 and 7,888,278, the entire contents of which are incorporated by reference herein.

Refractory binders that can be useful for the fabrication of the wall(s)/wall section(s) of a reformer include conventional and otherwise known materials as calcium aluminate, silica and alumina admixed with one or more metal oxides such as calcium oxide, strontium oxide and sodium oxide.

In certain embodiments of the invention, the amount of CPOX catalyst within the catalyst-containing wall section of a CPOX reactor unit can increase along the length of the wall section. For example, the amount of catalyst can increase in the direction from the inlet end to the outlet end of the CPOX reactor unit, and/or can decrease from the central inner surface to the outer external surface of the wall. Such gradients of CPOX catalysts can be present in the CPOX reaction zone of a CPOX reactor unit. This can help control the temperature at the ends of the CPOX reaction section. Preferred CPOX catalysts to be incorporated into the ceramic wall structure are well known in the art. These include the precious metal catalysts, such as platinum, palladium, nickel, rhodium, and the like, as well as iron containing catalysts, and combinations and alloys thereof.

Reactor Unit Assemblies

Each CPOX reactor unit will typically take the form of an elongated tube having a wall with an internal surface and an external surface. Preferably, the wall of the CPOX reactor unit encloses a hollow, open gas flow passageway and defines an inlet at the upstream end for receiving fluid flow and an outlet at the opposite downstream end for discharging the products of the reformation reaction. Each CPOX reactor unit can be in thermal communication with at least one adjacent CPOX reactor unit of the array. The CPOX reactor units can have at least a section of its wall, including the internal surface defining the hollow gas passageway, include the CPOX catalyst. The CPOX catalyst-containing wall section should be gas-permeable to allow the gaseous CPOX reaction mixture to diffuse therein and to allow the hydrogen-rich reaction product reformate to diffuse back into the central gas flow passageway. The CPOX catalyst-containing wall section must remain structurally stable under CPOX reaction conditions.

The CPOX reaction is exothermic. With respect to the array of spaced-apart CPOX reactor units (See FIG. 9 and the description thereof) and their thermal communication, the CPOX reactor units should be spaced apart at a maximum distance that is close enough for the heat of exotherm given off from the CPOX reaction in one CPOX reactor unit to provide enough activation heat energy to initiate a CPOX reaction in one or more adjacent CPOX reactor units. On the other hand, the CPOX reactor units should be spaced at a distance far enough apart to permit control of the temperature of the CPOX reactor units, particularly at the outlets of the CPOX reactor units. That is, the CPOX reactor units should be spaced far enough apart, so that heat loss can occur from a CPOX reactor unit to prevent heat induced damage to the CPOX reactor unit and if present, to a fuel cell stack that can be in fluid and thermal communication with the outlet(s) of the CPOX reactor unit(s). Those of ordinary skill in the art will understand how to space specific reactor units. With such positioning, an array of spaced-apart CPOX reactor units can provide an appropriate thermal balance among the array and can facilitate thermal uniformity throughout or across the array.

For example, the maximum distance between adjacent first and second CPOX reactor units can be that distance beyond which the heat of exotherm produced from a CPOX reaction in a first reactor unit is insufficient to initiate a CPOX reaction in the second CPOX reactor unit. In this manner, the CPOX reactor units should be spaced close enough, such that initiating a CPOX reaction in one (a single) CPOX reactor unit of an array of units will give off the necessary heat to initiate a CPOX reaction in an adjacent unit, and thereby, in each of the CPOX reactor units of the array of CPOX reactor units. Thus, the maximum distance can be that distance beyond which, during a steady-state mode of operation, the temperature of an array of CPOX reactor units falls below a predetermined minimum array temperature, for example, below about 550° C. or about 650° C. Those of ordinary skill in the art will understand how to space the units to achieve this condition, based on the dimensions, reaction conditions, fuel, etc.

The minimum distance between adjacent CPOX reactor units should be the distance beyond which, so much heat is transferred among the reaction units that damage occurs. That is, the units should be spaced at least far enough apart to prevent damage from occurring. For example, the distance below which the temperature at an outlet of a CPOX reactor unit is greater than a predetermined maximum temperature that will cause damage. The predetermined maximum temperature can be a temperature that is tolerable by an inlet of a fuel cell stack in thermal and fluid communication with an outlet of a CPOX reactor unit, for example, about 850° C. or 900° C. Those of ordinary skill in the art will understand how to space the units to achieve this condition, based on the dimensions, reaction conditions, fuel, etc.

Because the heat produced from one reactor unit can be effective to initiate the CPOX reaction in an adjacent unit, the CPOX reformer system can include a single igniter or more than one igniter, for example, two igniters, three igniters, or more, where additional igniters can be positioned in thermal communication with CPOX catalyst-containing wall sections of other CPOX reactor units. Reduction in igniters can reduce space, equipment, costs and the like.

The gaseous fuel CPOX reformer of an integrated reformer-fuel cell system also can include a source of gaseous reformable fuel in fluid communication with the inlets of the CPOX reactor units.

Manifold Gas Distribution

Another feature of the invention is a manifold for distributing gaseous CPOX reaction mixture to the inlets of the array of CPOX reactor units. For example, the manifold (or the manifold chamber) can be in fluid communication with the inlets of the CPOX reactor units. The manifold can be formed with a manifold housing, wherein the manifold housing defines a manifold chamber. The manifold can include a gaseous CPOX reaction mixture distributor disposed within, and extending for at least a majority of the length of, the manifold chamber. The gaseous CPOX reaction mixture distributor can be in fluid communication with a conduit that outputs a gaseous CPOX reaction mixture.

The gaseous CPOX reaction mixture distributor can include one or more outlets located at the respective inlets of the CPOX reactor units. The manifold can include a heater and/or passive heating elements in thermal communication with the manifold chamber. The manifold can include a cavity, where the manifold housing defines the cavity. A heat resistant seal can be disposed within or adjacent to the cavity. The manifold housing typically includes a plurality of cavities, wherein the number and arrangement of the cavities coincide with the number and arrangement of the inlets of the CPOX reactor units. The seal can engage the inlet of the CPOX reactor unit thereby providing a gas-tight seal between the manifold housing and the inlet.

Hybrid Steam Reforming

Another aspect of the invention provides methods of gaseous fuel CPOX reforming combined with electrochemical steam reforming and preferably also involves electrochemically converting the hydrogen-rich reformate product into electricity with a fuel cell, described more fully below. Methods in accordance with the invention include introducing a gaseous CPOX reaction mixture including a gaseous reformable fuel and an oxygen-containing gas (e.g., air) into inlets of CPOX reactor units of CPOX reformers; initiating catalytic partial oxidation of the CPOX reaction mixture and generating heat of exotherm; producing a hydrogen-rich reformate; delivering the hydrogen rich reformate to an inlet of a fuel cell; electrochemically converting the hydrogen into electricity and producing heat and steam; using that steam for steam reforming additional reformable fuel to produce additional hydrogen gas; and using a fuel cell unit to generate additional electricity with the additional hydrogen. Reforming fuel cells are also useful in carrying out the methods of the invention by reforming the fuel and producing hydrogen, electrochemically converting the hydrogen into electricity, heat and steam, using the heat and steam to reform additional fuel into additional hydrogen, and converting the additional hydrogen into additional electricity in accordance with the invention The additional (secondary) gaseous reformable fuel supply can be mixed with the steam generated in the fuel cell. Provisions should be made to maintain appropriate temperature to prevent coking or other deposits. This additional fuel can be supplied with a pipe extending through the open gas flow passageway. It should be small enough in diameter in relation to the diameter of the open gas passageway so as not to impact the flow of gas, such as by creating noticeable back pressure. this secondary fuel supply tube should not touch the surround tube, in order to avoid unwanted thermal and conversion gradients.

On start-up, only the primary fuel (and oxygen) stream flows, until the fuel cell begins to produce electricity. Then, as additional heat and electricity are produced, the amount of high temperature steam produced will increase. At this point, the secondary fuel stream can begin to be increased in direct proportion to the amount of electricity produced, which will be proportional to the amount of steam and heat produced. For every mole of water (steam) produced in the fuel cell, there can be an additional mole of fuel sent to the secondary fuel cell. Preferred operations run at about a ratio of oxygen to carbon (fuel) of about 0.9:1 to 1:0.9. Therefore, the secondary fuel stream will typically exceed 10 or 20% of the total, combined primary and secondary fuel streams. In preferred operations, the secondary fuel stream can exceed 40%, 50%, and even 60% of the combined fuel fed into the system. Additional oxygen can be added with the secondary fuel stream, or the same oxygen stream can be used, by reducing the primary stream as the secondary stream is increased, thereby maintaining the same oxygen to fuel ratio. Thus, the amount of electricity produced can exceed about 10%, 20%, 33% even 50% and more.

Open Gas Flow Passageway

As used herein, The expression "open gaseous or gas flow passageway" will refer to a conduit or channel for the passage of gas (including the CPOX reaction mixture) therethrough where a solid, including a porous solid or material, is not present across any part of the cross-sectional plane of the conduit or channel, i.e., a conduit or channel free of solids. Such solids include, but are not limited to porous solids. For example, in the case of a CPOX reactor unit, CPOX catalyst including a porous catalyst such as a monolith is not present across the internal cross-sectional plane perpendicular to the longitudinal axis of a tubular CPOX reactor unit. Such a structure is distinct from passageways which are packed with a porous catalyst, for example, a monolith, or honeycomb structure, as previously discussed. Nevertheless, a pipe or other conduit for the secondary fuel supply may be present, as long as the diameter of the pipe is small enough with respect to the diameter of the open gaseous flow passageway, so as not to affect the flow of gas through the passageway.

An open gas flow passageway also can be present in a CPOX reactor unit which can be defined as a tube which defines a hollow bore, or a cylindrical substrate defining a hollow bore therethrough along its longitudinal axis. In these exemplary descriptions, the hollow bore can be considered an open gaseous flow passageway. Although an open gaseous flow passageway will typically extend along a longitudinal axis of a CPOX reactor unit, a tortuous conduit or channel also is contemplated by the present teachings and can be capable of having an open gaseous flow passageway provided that the tortuous conduit or channel is free of solids across a cross-sectional plane of the CPOX reactor unit. It also should be understood that the cross-sectional dimension (s) of an open gaseous flow passageway can vary long its longitudinal axis or along the tortuous conduit or channel.

Nevertheless, as discussed above, it should be understood that an open gaseous flow passageway may include a conduit for providing supplemental reformable fuel to the outlet of the reaction zone, whereby the fuel from the conduit encounters steam from the reforming and is subject to steam reforming. Said fuel conduit should be relatively small with respect to the open gaseous flow passageway, and should not significantly interfere with the flow of fuel and reformate therethrough. Thus, it should have a relatively small cross sectional area with respect to the cross sectional area of the open gaseous flow passageway. This pipe for the secondary fuel supply should occupy well under 20%, 10% and even well under 5% of the cross section of the open gas flow passageway.

As those skilled in the art will readily recognize and appreciate, the cross sectional configuration and dimensions of a reforming reactor unit and, in reformers having a plurality, or array of such reactor units, the number of reactor units and the distances of their separation from each other measured from their geometric centers, or centroids, will be made to depend on the operational and mechanical performance specifications for a particular reforming reactor. In the case of a reforming reactor unit of substantially uniform circular cross section, the length, internal and external diameters (defining the thickness of the gas-permeable wall) and the location, length and thickness of the hydrogen barrier attached to the outer surfaces of the gas-permeable wall will be determined by, among other things, the hydrogen-producing capacity of the reformer.

Referring again to the drawings, FIG. 8A shows an exemplary cross sectional view of a CPOX reactor unit 400. An end view of reactor unit 400 is shown in FIG. 8B. A gas-permeable wall 451 of CPOX reactor unit 400 is formed of or contains CPOX catalyst. Gas permeable wall 451 includes an outer surface 462 and an inner surface 461, which defines an open gaseous flow passageway 463. Hydrogen barrier 465 is disposed on outer surface 462 of gas-permeable wall 451. CPOX reactor unit 400 includes an inlet 401 and an outlet 402. Gas flows in the direction of an arrow F.

Open gaseous flow passageway 463 allows for the substantially unimpeded flow of the gaseous CPOX reaction mixture and hydrogen-containing reformate therein. This open flow path contributes to the low back pressure, which is a characteristic of the operation of preferred CPOX reformers in accordance with the invention. In operation, back pressures of not more than about 3 inches of water (0.0075 bar), for example, not more than about 2 inches of water, or not more than about 1 inch of water, are readily achievable and preferred. As the CPOX reaction mixture flows through open bore 463 in the direction of arrow F, it diffuses into CPOX containing wall 451, and then unreformed fuel, unused oxygen, and reaction product hydrogen and carbon monoxide reformate diffuse out of wall 451 (arrow D), and eventually through outlet 402.

Fuel Cells

Fuel cells in accordance with the invention can exothermically convert the hydrogen reformate produced by the CPOX reaction into electricity. Fuel cells are exothermic and can act as the heat supply for the added-on steam reforming.

A fuel cell is a device that converts the potential energy of a fuel source directly into electricity, through an electrochemical reaction. A fuel cell unit in accordance with the invention can comprise a pair of electrodes (an anode and a cathode) separated by an electrolyte. The electrolyte selectively permits the passage of only certain types of ions. This selective passage of ions across the electrolyte results in a potential being generated between the two electrodes. This potential can be harnessed to produce electricity. This direct conversion process of chemical energy into electricity increases the efficiency of power generation by removing mechanical steps required by traditional power generating devices such as internal combustion engine-driven electrical generators. Additionally, the combination of higher efficiency and electrochemical processes provides an energy-efficient, resource-conserving and environmentally sound source of electrical power.

The fuel cell section of an integrated reformer-fuel cell system in accordance with the invention can include a fuel cell combined with a fuel reformer to receive the reformate product of the reformer. Fuel cells in accordance with the invention have an anode, a cathode, and an electrolyte disposed therebetween. The anode of the fuel cell unit can be in fluid communication with an outlet of the CPOX reactor unit. The cathode of the fuel cell unit can be in fluid communication with (a source of) an oxygen-containing gas such as air. The fuel cell section should include a current collector, electrically coupled to the fuel cell unit's anode and cathode.

Fuel cell units in accordance with the invention can be a solid oxide fuel cell or a polymer electrolyte membrane (or proton exchange membrane) fuel cell. The fuel cell unit of an integrated reformer-fuel cell system can preferably include a tubular solid oxide fuel cell, for example, a multi-tubular solid oxide fuel cell.

An anode of the fuel cell unit in accordance with the invention can preferably be in fluid communication with an outlet of the CPOX reactor unit via a conduit or a direct connection of outlet to inlet. The conduit (or connection) can transport the hydrogen-rich reformate therethrough. A cathode of the fuel cell unit in accordance with the invention can be in fluid communication with (a source of) an oxygen-containing gas (air) via another conduit, for example, an air conduit. In certain embodiments of the invention, an outlet of the CPOX reactor unit can be connected directly to the inlet of the fuel cell unit, where the inlet of the fuel cell unit is in fluid communication with the anode of the fuel cell unit. The fuel cell section in accordance with the invention can also include an afterburner in fluid communication with the outlet of the fuel cell unit.

In operation, a fuel source, such as hydrogen, a hydrocarbon, an alcohol, carbon monoxide, or mixture of any of the foregoing, combines with oxygen anions (such as from air) at the anode layer and produces water vapor and/or carbon dioxide and electrons and heat. The electrons generated at the anode layer migrate through the external load and back to the cathode layer, where oxygen (preferably provided airflow) combines with the electrons to provide oxygen anions. These oxygen anions selectively pass through the electrolyte layer and into the anode layer. SOFCs are exothermic and operate at fairly high temperatures, e.g., in the order of 850-1000° C. Any water present will be vaporized to steam. This heat and steam can be used to steam reform additional fuel.

There are three general known types of SOFCs: (1) monolithic SOFCs, which possess a honeycomb construction formed by fusing together thin sheets of ceramic material into a monolithic block; (2) tubular SOFCs, which possess a tubular, typically cylindrical, configuration; and (3) planar SOFCs, which possess a flat, plate-like shape. The tubular structure is employed with preferred embodiments of the invention.

A preferred type of fuel cell in accordance with the invention is a solid oxide fuel cell (SOFC). Such fuel cells possess three basic components: an anode layer that generates electrons, a cathode layer that consumes electrons, and an intermediate electrolyte layer that selectively conducts ions, but prevents electrons from passing.

An assembly of tubular solid oxide fuel cells in accordance with the invention can comprise:
a) at least two axially elongated tubular solid oxide fuel cell units, sharing at least one external current collector, each fuel cell unit comprising:
  i) first end and second end sections, with an intermediate section therebetween; and
  ii) an inner electrode layer, an outer electrode layer and an electrolyte layer therebetween;
b) at least one external, shared current collector in electrical contact with an electrode layer of at least two fuel cell units, the current collector possessing a coefficient of thermal expansion greater than that of the fuel cell units, the current collector and each electrode layer in electrical contact therewith possessing substantially conforming electrical contact surfaces; and,
c) at least one retainer configured to retain at least one section of at least two fuel cell units and at least a portion of a shared current collector, in close-fitting relationship therewith, the coefficient of thermal expansion of the retainer preferably being less than or equal to that of the fuel cell units, the portion of the current collector retained within the retainer when thermally expanded, placing the electrode surface of each fuel cell unit in electrical contact therewith, under compression.

During operation of a fuel cell device incorporating the tubular SOFC assemblies in accordance with the invention, thermal expansion of a current collector component, with its higher coefficient of thermal expansion compared with that of the fuel cell units with which the current collector is in electrical contact, can result in a compressive force being exerted against the electrical contact surfaces of the electrode layers of the fuel cell units. As a result of this compressive force, the original area of electrical contact between the current collector and its associated electrodes will remain substantially constant, even after many on-off cycles of operation, thereby eliminating or mitigating ohmic losses in a fuel cell device incorporating the tubular SOFC assembly of this invention.

Referring again to the drawings, a tubular fuel cell unit 100 is shown generally in FIGS. 1A and 1B. Fuel cell unit 100 represents one of numerous embodiments of tubular fuel cells that can be utilized in accordance with the invention. Fuel cell unit 100 includes substantially identical first and second end sections 101 and 102, an intermediate section 103 and a plurality of convex surfaces 104 alternating with a plurality of concave surfaces 105, extending for the full length of fuel cell unit 100.

Portions of end sections 101 and 102 of fuel cell unit 100 are shown "peeled away" to better illustrate the arrangement of an inner anode layer 106, an outer cathode layer 107 and an intermediate electrolyte layer 108. Fuel cell unit 100 includes a hollow, open bore 109, which serves as an unobstructed conduit for the flow of fuel through the length of fuel cell unit 100. Bore 109 is defined by the inner surface of the inner anode layer 106. Note that while the cross section of fuel cell unit 100 is depicted as generally symmetrical, it will be understood that this need not be the case as one convex curve can be longer than the other, or otherwise.

Referring to FIG. 1B, fuel cell unit 100 presents an exposed electrical contact surface 110 of inner anode layer 106, to allow for electrical contact of such surface with a conforming electrical contact surface of an associated current collector. Exposed electrical contact surface 110 of anode layer 106 can extend for just a portion of the length of concave curve 105 of fuel cell unit 100, e.g., at its first end section 101, its second end section 102 and/or at its intermediate section 103. Alternatively, such contact surface can extend for up to the full length of concave surface 105, i.e., from the beginning of first end section 101 to the end of second end section 102.

Referring to FIG. 1B, fuel cell unit 100 presents an exposed electrical contact surface 110 of inner anode layer 106, to allow for electrical contact of such surface with a conforming electrical contact surface of an associated current collector. Exposed electrical contact surface 110 of anode layer 106 can extend for just a portion of the length of concave curve 105 of fuel cell unit 100, e.g., at its first end section 101, its second end section 102 and/or at its intermediate section 103. Alternatively, such contact surface can extend for up to the full length of concave surface 105, i.e., from the beginning of first end section 101 to the end of second end section 102.

Referring to FIGS. 1C and 1D, a circular tubular fuel cell unit 100a is shown generally. Fuel cell 100a is similar to fuel cell 100, but is circular in shape. Thus, fuel cell unit 100a represents another of the numerous embodiments of tubular fuel cells that can be utilized in accordance with the invention.

Fuel cell unit 100a includes substantially identical first and second end sections 101a and 102a, an intermediate section. Portions of end sections 101a and 102a of fuel cell unit 100a are shown "peeled away" to better illustrate the arrangement of an inner anode layer 106a, an outer cathode layer 107a and an intermediate electrolyte layer 108a. Fuel cell unit 100a includes a hollow, open bore 109a, which serves as an unobstructed conduit for the flow of fuel through the length of fuel cell unit 100a. Bore 109a is defined by the inner surface of the inner anode layer 106a.

Referring to FIG. 1D, fuel cell unit 100a presents an exposed electrical contact surface 110a of inner anode layer 106a, to allow for electrical contact of such surface with a conforming electrical contact surface of an associated current collector. Exposed electrical contact surface 110a can extend for up to the full length of surface 105a, i.e., from the beginning of first end section 101a to the end of second end section 102a.

Fuel cell unit 100, 100a, and its many variations can be fabricated from known and conventional anode layer-forming, electrolyte layer-forming and cathode-layer forming compositions, e.g., as disclosed in U.S. Pat. Nos. 6,228,521, 6,436,565, 7,498,095, and 9,774,055, the entire contents of which are incorporated herein by reference. If desired, one or more additional layers, e.g., an optional electrically conductive layer and/or an optional interfacial layer disposed between the cathode layer and electrolyte layer, to reduce polarization losses as described in U.S. Pat. No. 5,993,989 layer, incorporated herein by reference, can be provided. The fuel cell units can also be of the internal reforming type, e.g., as described in U.S. Pat. No. 8,435,683, incorporated herein by reference.

Fuel cell unit 100 or 100a is of the internal anode (fuel electrode)-supported and external cathode (air electrode) type. However, tubular fuel cell units comprising an internal cathode layer and an external anode layer, and cathode-supported and electrolyte-supported tubular fuel cell unit configurations are also contemplated for construction of a tubular SOFC assembly in accordance with this invention.

Reforming Fuel Cells

It is particularly advantageous to combine the reforming aspects of a CPOX reformer in accordance with the invention with a fuel cell in accordance with the invention, to provide an internal reforming fuel cell. Preferred embodiments of the invention include oxide fuel cells with an integrated reforming catalyst layer. Internal reforming catalyst layers can be readily formed on the anode or cathode layer of the fuel cell by known slurry coating and catalyst impregnation methods. Internal reforming fuel cells are described in U.S. Pat. No. 8,435,683, the contents of which are incorporated herein by reference.

One embodiment of the invention relates to a solid oxide fuel cell that includes a cathode, an electrolyte, an anode, and a catalyst layer in contact with the anode. The catalyst layer includes a support membrane and a reforming catalyst that is associated with the support membrane. The reforming catalyst can include one or more metals selected from Pt, Ni, W, Ru, Au, Pd, Mo, Cu, Sn, Rh, V, and the like. In preferred embodiments of the invention, the reforming catalyst can be a partial oxidation reforming catalyst. For example, platinum and/or palladium can be used as the partial oxidation reforming catalyst.

In certain embodiments of the invention, the reforming catalyst can also include a steam reforming catalyst. For example, Ru can be used as the steam reforming catalyst. In various embodiments of the invention, the reforming catalyst can be impregnated in the support membrane. The support membrane can be a porous ceramic, especially refractory materials. It can be prepared from one or more metal oxides. For example, it can be selected from aluminum oxide (alumina), zirconium oxide (Zirconia), titanium oxide, lanthanum oxide (lanthana), lanthanum strontium oxide, cerium oxide (ceria), molybdenum oxide, zinc oxide, and calcium titanium oxide. In preferred embodiments of the invention, the support membrane can include one or more perovskites, as discussed more fully above. The support membrane can include various additives including, without limitation, one or more dispersants, plasticizers, and binders.

In preferred embodiments of the invention, a surface of the anode can be at least partially covered by the catalyst layer and/or the surface of the anode can be substantially covered by the catalyst layer. For example, the fuel cell can be configured such that the fuel is directed to pass through or over the catalyst layer before contacting the anode. In preferred embodiments of the invention, about 80% of the surface area of the exposed surface of the anode can be covered by the catalyst layer. In preferred embodiments, the catalyst layer can have a thickness between about 5 μm and about 50 μm.

In other preferred embodiments of the invention, the solid oxide fuel cells are integrated with a partial oxidation reforming catalyst layer supported on an anode. Such solid oxide fuel cells are capable of internally reforming hydrocarbon fuels (e.g., propane) without significant coking and/or power loss. During operation of such a solid oxide fuel cell, a hydrocarbon fuel is reformed by passage through, diffusing into and/or over a porous catalyst layer in the presence of oxygen, such as from air. The partial oxidation reforming reaction can deplete the hydrocarbon fuel of C-C bonds, thereby reducing or preventing carbon deposition on the anode.

Integrated CPOX and Steam Reforming

Referring again to the drawings, FIGS. 2-4 depict the inlet of a fuel cell coupled to the outlet of a CPOX reformer. This integrated system also performs steam reforming and is shown generally as a CPOX/steam reformer 200. A CPOX reforming section 210 of CPOX/steam reformer 200 begins at upstream end 201 and has a downstream end 202. CPOX reforming section 210 is similar to CPOX reformer 400 of FIGS. 8A and 8B. An upstream end 203 of a tubular solid oxide fuel cell 220 is coupled to and extends downstream from downstream end 202 of CPOX reformer section 210. Fuel cell 220 has a downstream end 204.

CPOX reformer section 210 comprises a hollow open bore gas flow passageway 211, defined by a wall 212 formed of or comprising CPOX catalyst. CPOX catalyst-containing wall 212 is porous on its inner surface and has a hydrogen barrier 214 over its outer surface to prevent or inhibit hydrogen loss. A first stream of gaseous or vaporized fuel and oxygen (air) (reaction mix) 260 flows into a catalyst substrate fuel inlet 213 of CPOX reformer section 210 at upstream end 201. Because CPOX catalyst containing wall 212 is porous, first gaseous fuel stream 260 will diffuse into wall 212, encounter the CPOX catalyst therein, and begin to be reformed into hydrogen gas. The reaction products, including hydrogen reformate, carbon monoxide, unreformed fuel, and unused oxygen, which will all then diffuse out of wall 212, back into open bore 211, as shown by arrows 261. Thus, at a downstream end 202 of CPOX reformer section 210, a stream of hydrogen gas, carbon monoxide and the unreformed fuel and unused air will flow into upstream end 203 of tubular solid oxide fuel cell 220.

A secondary fuel injector 250, in the form of a secondary fuel conduit (e.g., a pipe), extends through open bore 211, from upstream end 201 to downstream end 202. Preferably, the cross sectional area of fuel injector 250 is small enough so as not to impart back pressure to gas streams 260 and 261 flowing through bore 211. A downstream end 251 of fuel injector 250 extends slightly past downstream end 202 of CPOX reforming tube 210, slightly past upstream end 203 of tubular solid oxide fuel cell 220, and a slight distance into fuel cell 220. A secondary stream of gaseous or vaporized fuel 252 is injected into a fuel injector inlet 253 of fuel injector 250, preferably slightly downstream of upstream end 203. Because fuel injector 250 is not porous, secondary fuel stream 252 will flow from upstream end 201, into an initial upstream region of tubular solid oxide fuel cell 220. This fuel will absorb some of the heat generated by CPOX reforming after it exits CPOX reformer section 210. Those skilled in the art will understand how to control the temperature of secondary fuel stream 251, to insure that fuel stream 252 is does not flash, crack, or otherwise become no longer reformable.

As tubular solid oxide fuel cell 220 operates and produces electricity, it will also produce steam and heat. Fuel cell 220 is also constructed to perform steam reforming, such as with the inclusion of steam reforming catalyst. This steam and heat will function to perform steam reforming of secondary fuel stream 252 in a steam reforming reaction region 280. This will result in the production of additional hydrogen, which will also create additional electricity, heat and steam, and could further steam reform any of the remaining reformable fuel into additional hydrogen.

This additional steam reforming and electricity production can be achieved without increasing the size of the CPOX reformer/fuel cell combination and without external heat for the endothermic steam reforming. Thus, enhanced efficiency of up to 35-40%, based on the energy of the fuel input to the system and the energy of the electricity produced. Efficiencies as high as 50 to 55% can be achieved.

Steam reforming is an endothermic reaction. However, because CPOX reforming and fuel cell operation are exothermic, and also result in the production of steam, this steam and heat are put to efficient use. It should be noted that downstream end 251 of fuel injector 250 should extend partially into upstream end 203 of tubular solid oxide fuel cell 220. If downstream end 251 is at upstream end 203 of fuel cell 220, heat conditions might not be suitably hot enough for steam reforming, and deposits of coke and the like could occur. Those of ordinary skill in the art will readily be able to determine the minimum distance downstream end 251 should extend, based on the operating conditions of fuel cell 220, in order to prevent coking and the like. For example, even a short extension of at least 10 mm, or even 5 mm or 2 mm into fuel cell 220 will be beneficial.

Referring now to FIGS. 5 and 6, a fuel cell with an integrated CPOX and steam reformer in accordance with preferred embodiments of the invention is shown generally as an enhanced CPOX/steam reformer 500. Enhanced CPOX/steam reformer 500 is similar in most respects to integrated CPOX/steam reformer 200. However, enhanced CPOX/steam reformer 500 includes a fuel injector conduit 550 through a CPOX reforming section 510. Injector 550 is similar to fuel injector 250. Likewise, fuel injector 550 is formed as a nonporous conduit, and is used to inject secondary fuel into a tubular solid oxide fuel cell 520, which is similar to tubular solid oxide fuel cell 220. However, a main difference between injector 250 and injector 550, is that an outer surface of injector 550 is covered with a porous layer of CPOX catalyst 555. Therefore, primary fuel stream 560 travels down a hollow bore 511 of CPOX reforming section 510, and diffuses into a CPOX containing wall 512 (similar to wall 212). Hydrogen reformate dissipates back into bore 511. Steam reformation of supplemental fuel 552 will occur at a steam reforming reaction region 580 to produce additional hydrogen. However, additional CPOX reformation will occur as fuel diffuses into CPOX catalyst layer 555 and additional reformation product will diffuse out. Thus, additional CPOX reformation of fuel into hydrogen will occur at layer 555, without significant increase of the size of Section 510, compared to section 210.

Reformer Cell and Power Cell

Figure 7:
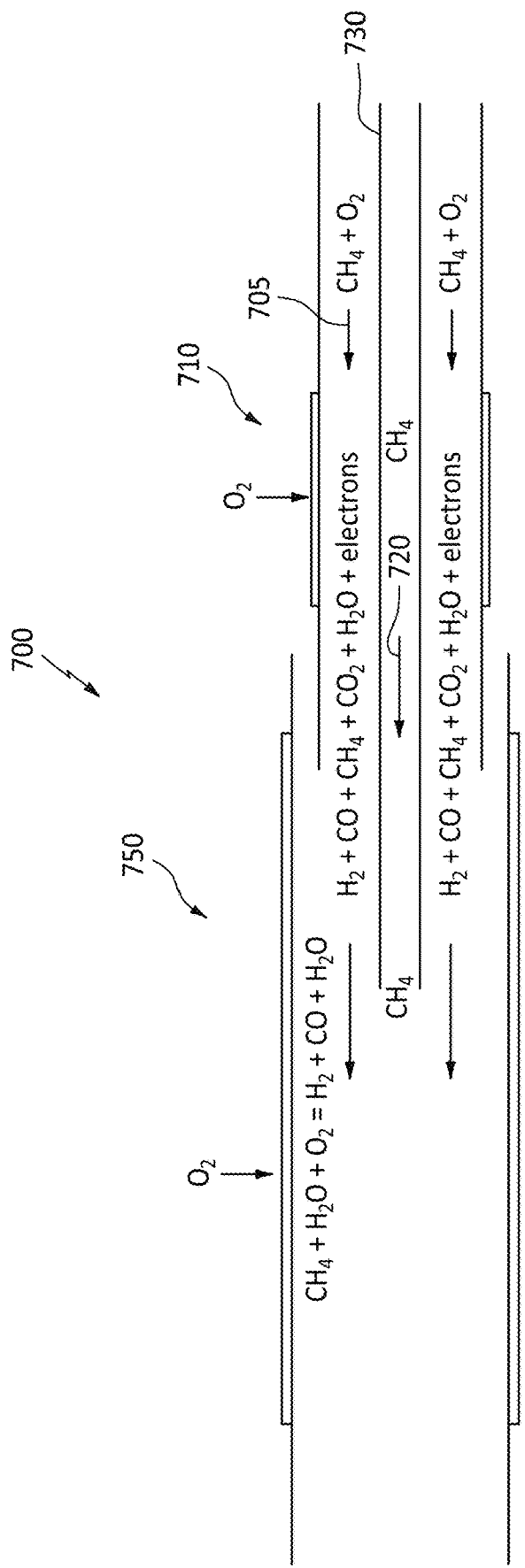
FIG. 7 is a schematic side view of an integrated power fuel cell and reforming fuel cell, in accordance with an embodiment of the invention.

A combined reformer fuel cell and power fuel cell is shown generally in FIG. 7 as a hybrid fuel cell 700. Hybrid fuel cell 700 includes a reformer fuel cell 710 at its upstream end, feeding into an upstream end of a power fuel cell 750. Reformer fuel cell 710 is similar to the reforming fuel cells discussed above. Thus, a gaseous stream of a reformable gaseous or vaporized liquid fuel, such as methane or vaporized kerosene, is combined with an oxygen source, such as air, to form a gaseous reformable mixture 705. Gaseous reformable mixture 705 enters the upstream end of reformer fuel cell 710. As it passes through reformer fuel cell 710, the fuel/air reaction mix encounters CPOX catalyst, and is partially reformed into hydrogen gas, as well as carbon monoxide, as discussed above. The hydrogen, carbon monoxide, unreformed methane, and steam exit reformer fuel cell 710, and enter the upstream end of power fuel cell 750. This hydrogen gas interacts with reformer fuel cell 710, to produce electricity, heat and steam.

At the upstream end of power fuel cell 750, hydrogen from reformer fuel cell 710 begins to produce additional electricity, in an exothermic reaction. The heat from the fuel cell reaction will act to foster the steam reforming of any unreformed methane entering power fuel cell 750. This will produce additional hydrogen, which will produce additional electricity, additional heat, and further heat the steam available for additional steam reforming of any available fuel.

Steam reforming catalyst should be present. A secondary reformable fuel stream of methane (or other gaseous or vaporized fuel) 720 is added to power fuel cell 750, preferably slightly downstream from the upstream end of cell 750. Fuel stream 720 is fed with conduit 730. The heat of exotherm will steam reform the additional fuel from secondary fuel stream 720 to produce additional hydrogen, which will produce additional electricity and still more heat, for still more steam reforming. Furthermore, in still another embodiment of the invention, the outer surface of conduit 730 can be coated with CPOX catalyst, as discussed above, to improve the efficiency of the CPOX reforming in reformer cell 710.

The downstream end of conduit 730 should extend slightly past the upstream edge of power cell 750, into the depth of power cell 750, by at least 5 to 10 mm. Steam reforming is endothermic. Thus, at the extreme upstream edge of power cell 750, there may not be enough heat for efficient steam reforming, and coking and other deposits can occur. Those of ordinary skill in the art will understand how far into power cell 750 to extend conduit 730.

Secondary Fuel Injector Geometry

The geometry of the portion of the downstream end of the secondary fuel line, that inject fuel into the upstream end of the fuel cell, can have a significant impact on the operation of the hybrid power generating systems discussed herein. For example, the electrochemical reactions discussed herein can be analyzed as boundary conditions at the interface of the fluid flow past a surface under steady-state operating conditions.

It has been determined that the geometry of the secondary fuel injector outlet of can significantly affect fluid flow dynamics, and importantly, help prevent separation between the flowing gaseous reactants and the fuel cell surface. At the downstream end of the secondary fuel line, the flow dynamics of the fuel undergoes an abrupt change, as the diameter abruptly changes from that of the small diameter secondary fuel line, to that of the larger diameter fuel cell. This can occur, for example, when the secondary fuel exits conduit 550 and enters fuel cell 520 of CPOX/steam reformer 500.

Turning now to FIG. 11, a hybrid CPOX reformer and fuel cell 1100 in accordance with the invention is shown with a straight, uniform fuel injector section 1151. FIG. 11 depicts gas flow 1161 from a reformer section 1110 flowing through a fuel cell section 1120. A flow of secondary fuel 1152 is shown exiting injector 1151. Because secondary fuel 1152 experiences an abrupt change in diameter, large velocity distributions can be created, leading to undesirable flow separation from the inner surface of fuel cell 1120.

FIG. 12, depicts a hybrid CPOX reformer and fuel cell 1200, in accordance with other preferred embodiments the invention, with a flared fuel injector section 1251. Preferred materials for flared fuel injector section 1251 include refractory ceramics, alumina, ceria, YSZ, and the like. YSZ refers to yttria-stabilized zirconia, a ceramic in which the cubic crystal structure of zirconium dioxide is stabilized with the addition of yttrium oxide. Printing of flared section 1251 is a preferred construction method. Printing assists in the formation of blended structures in the walls and to form geometries that are harder to make via traditional ceramic manufacturing techniques. It can also be advantageous for reducing the triangular flared section down into the feed reformer tube section. It can also be advantageous to cover the outside of flared section 1251 with reforming catalyst and supplement or eliminate the reforming catalyst layer on the surrounding tube, as a way to adjust flow dynamics.

FIG. 12 shows flared fuel injector 1251 as having a triangular cross section, but other flared cross-sectional configurations (with or without a catalyst covering), such as circular, rectangular, etc. can also be suitable. FIG. 12 shows gas flow 1261 from a reformer section 1210 flowing through a fuel cell section 1220. A flow of secondary fuel 1252 is shown exiting injector 1251. Because secondary fuel 1252 does not experience an abrupt change in diameter, large velocity distributions are reduced, reducing flow separation from the inner surface of fuel cell 1220. Enhanced diffusive mixing can also take place near the downstream end of injector section 1251. A flared fuel injector section can also create a larger area cold zone, spreading out the endothermic reactions due to better mixing.

Figure 13:
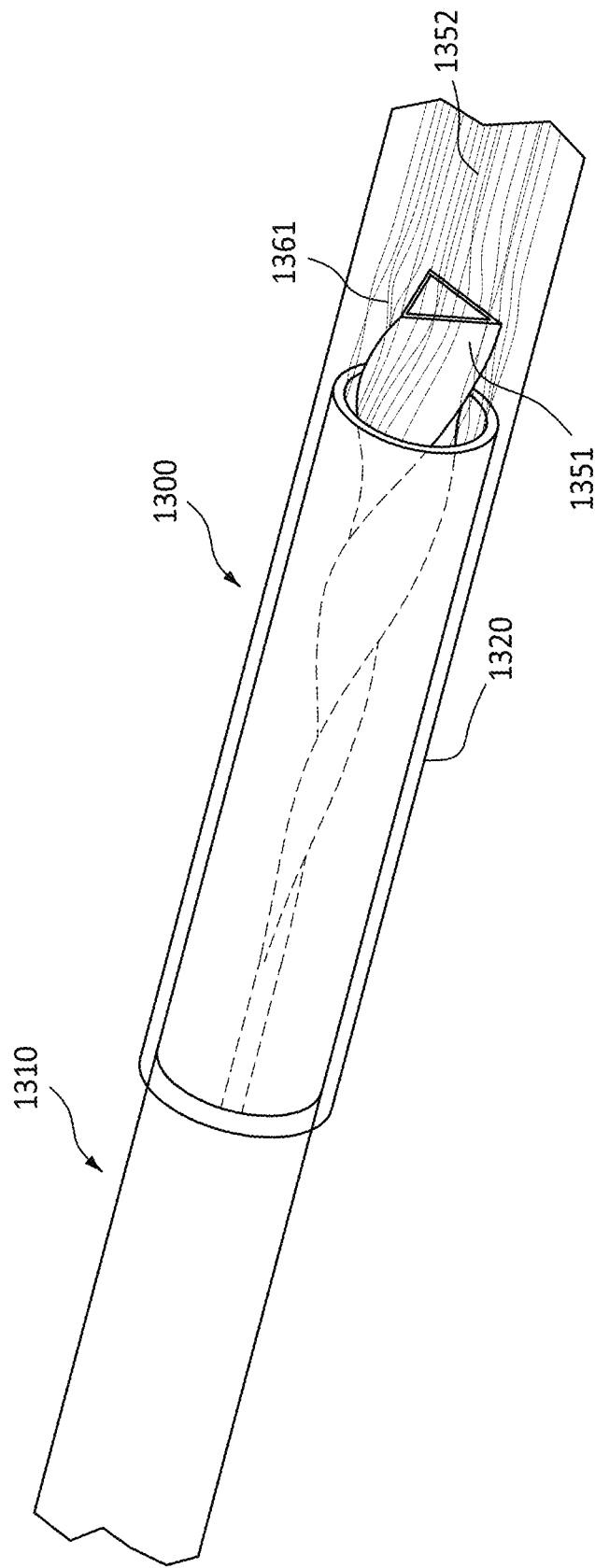
FIG. 13 is a transparent view of a flared and swirled injector for injecting secondary fuel into the upstream end of a fuel cell in accordance with an embodiment of the invention.

Referring to FIG. 13, a flared fuel injector 1351 of a hybrid reformer fuel cell 1300 is shown that is both flared and swirled. FIG. 13 shows flared fuel injector 1351 as having a triangular cross section, but other flared cross-sectional configurations (with or without a catalyst covering), such as circular, rectangular, etc. can also be suitable. FIG. 13 shows gas flow 1361 from a reformer section 1310 flowing through a fuel cell section 1320. A flow of secondary fuel 1352 is shown exiting injector 1351. Because secondary fuel 1352 does not experience an abrupt change in diameter, large velocity distributions are reduced, reducing flow separation from the inner surface of fuel cell 1320. Also, the swirled surface of flared section 1351 can lead to enhanced mixing of the secondary fuel and the other reactants, for improved reactivity, as well as the improved gas flow patterns of reformer fuel cell 1200.

Integrated System

Figure 9:
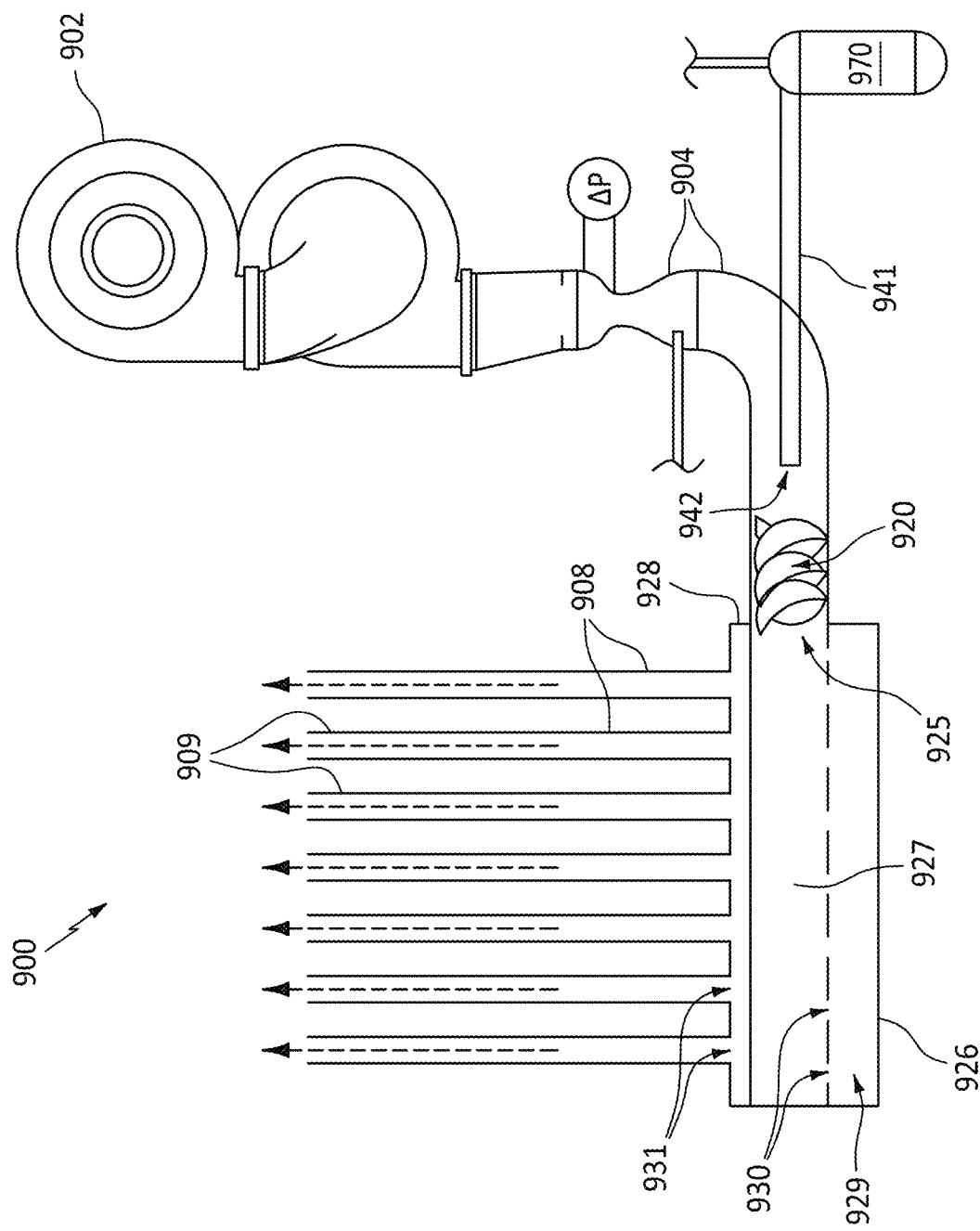
FIG. 9 is a schematic block diagram of an integrated fuel cell and fuel reforming system in accordance with an embodiment of the invention.

A schematic view of a system incorporating the reactors and reformers and fuel cells disclosed herein is shown generally in FIG. 9 as a reformation system 900. A gaseous or vaporized liquid fuel 970 is introduced into a conduit 904 via a fuel line 941 and a fuel inlet 942. Fuel and air from a blower 902 combine in a mixing zone 920 of conduit 904 to provide a gaseous CPOX reaction mixture. A mixer of any suitable kind, for example, a static mixer disposed within mixing zone 920 and/or a helically-grooved internal wall surface of conduit 904, can be included to provide a gaseous CPOX reaction mixture of greater compositional uniformity than otherwise would form in mixing zone 920.

Following its passage through the optional static mixer and/or contact with helical grooves disposed within mixing zone 920, the gaseous CPOX reaction mixture exits conduit 904 through an outlet 925 and enters a gas distributor 927 of a manifold 926, which is configured to provide a more uniform distribution of the reaction mixture to, and within, tubular reactor and or fuel cell units 908. Thus, reactors or fuel cells 908 can comprise any of the reactors and/or fuel cells discussed above. Such an arrangement or other arrangement within the present teachings can provide a distribution of gaseous CPOX reaction mixture where the difference in flow rate of the gaseous CPOX reaction mixture within any two units 908 is not greater than about 20 percent, for example, not greater than about 10 percent, or most preferably not greater than about 5 percent.

Returning to FIG. 9, manifold 926 includes a manifold housing, or enclosure, 928 defining a manifold chamber 929 within which gaseous CPOX reaction mixture (gas) distributor 927 is connected to outlet 925 of conduit 904. Gaseous CPOX reaction mixture exiting conduit 904 through outlet 925 enters gas distributor 927, thereafter passing outwardly through an arrangement of apertures (e.g., holes or slots) 930 located at the bottom or lower part of the gas distributor, facing away from units 908. The gas then flows around first down, then around and up towards the respective inlets of units 908. After flowing around the exterior surface of the distributor to its top or upper part, the gas flows to an arrangement of inlets 931 of tubular units 408.

Some specific factors that can bear upon the optimization of the design of a manifold for accomplishing its function of promoting a more uniform distribution of gaseous CPOX reaction mixture to CPOX reactor units include the configuration of its housing, the volume of its chamber, and the dimensions of the gas distributor including the number, design and placement of its orifices. Such factors in turn depend on such reformer design and operational factors as the target flow rates of gaseous CPOX reaction mixture within a conduit, the number and arrangement of CPOX reactor units, the shape and dimensions of inlets of CPOX reactor units, and similar considerations. A manifold of optimal fuel-air distribution performance for a particular gaseous fuel CPOX reformer in accordance with the present teachings can be readily constructed by those skilled in the art employing routine testing methods.

What is claimed is:

1. A method of combined CPOX and steam reforming, comprising:
    flowing a first reformable fuel stream and an oxygen containing gas stream into an inlet of a CPOX reaction zone of a CPOX reactor containing a CPOX catalyst, and at least partially reforming the first reformable fuel stream and generating a heat of exotherm and a reaction product stream exiting an outlet of the CPOX reaction zone, the reaction product stream including a first amount of hydrogen;
    flowing a second reformable fuel stream through the CPOX reaction zone, isolating the second reformable fuel stream from the CPOX catalyst, and not reforming the second reformable fuel stream within the CPOX reaction zone;
    flowing the reaction product stream into an inlet of a fuel cell, and generating a first amount of electricity, heat and steam with the fuel cell;
    flowing the secondary fuel stream into the fuel cell and steam reforming the second reformable fuel stream with the heat and steam generated by the fuel cell and producing a second amount of hydrogen.

2. The method of claim 1, wherein the CPOX reaction zone comprises an open gas flow passageway defined by a wall containing the CPOX catalyst, wherein the first reformable fuel stream and the oxygen containing gas diffuse into the CPOX catalyst containing wall and the reaction product diffuses back into the open gas flow passageway.

3. The method of claim 2, wherein the second reformable fuel stream flows through the CPOX reaction zone within a conduit extending through the open gas flow passageway.

4. The method of claim 3, wherein the conduit has an outlet and the conduit outlet extends past a downstream end of the outlet of the CPOX reaction zone and past an upstream end of an inlet of the fuel cell.

5. The method of claim 3, wherein an outside surface of the conduit within the CPOX reaction zone is at least partially covered with a layer of CPOX catalyst and some of the first reformable fuel stream diffuses into the layer of CPOX catalyst on the conduit and forms a second reaction product, which diffuses back into the open gas flow passageway.

6. The method of claim 3, wherein the CPOX reaction zone comprises a perovskite-containing wall structure.

7. The method of claim 3, wherein a cross sectional area of the conduit occupies less than 20% of a cross sectional area of the open gas flow passageway.

8. The method of claim 2, wherein there is a hydrogen barrier outside the wall preventing substantially any loss of hydrogen therethrough.

9. The method of claim 8, wherein the hydrogen barrier comprises a layer of metal.

10. The method of claim 1, wherein the fuel cell reacts the second amount of hydrogen and generates a second amount of electricity, heat and steam.

11. The method of claim 10, wherein the efficiency of the conversion of the reformable fuel into electricity is at least 35% higher than the efficiency of the same method of CPOX reforming without the step of steam reforming the secondary fuel stream.

12. The method of claim 10, wherein the second amount of electricity is at least 10% of the first amount of electricity.

13. The method of claim 10, wherein the second amount of electricity is at least 33% of the first amount of electricity.

14. The method of claim 1, wherein the molar ratio of the second reformable fuel stream to the first reformable fuel stream is at least 1:9.

15. The method of claim 1, wherein the molar ratio of the second reformable fuel stream to the first reformable fuel stream is at least 4:6.

\* \* \* \* \*